United States Patent
Peng et al.

(10) Patent No.: US 11,399,361 B2
(45) Date of Patent: Jul. 26, 2022

(54) V2X SIDELINK COMMUNICATION

(71) Applicant: HUAWEI TECHNOLOGIES CO., LTD., Guangdong (CN)

(72) Inventors: Wenjie Peng, Shanghai (CN); Jun Wang, Shanghai (CN); Mingzeng Dai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/132,632

(22) Filed: Dec. 23, 2020

(65) Prior Publication Data
US 2021/0120528 A1    Apr. 22, 2021

Related U.S. Application Data

(63) Continuation of application No. PCT/CN2019/092976, filed on Jun. 26, 2019.

(30) Foreign Application Priority Data

Jun. 27, 2018 (CN) .......................... 201810680516.3

(51) Int. Cl.
H04W 72/04 (2009.01)
H04W 4/50 (2018.01)
H04W 4/40 (2018.01)

(52) U.S. Cl.
CPC ............ *H04W 72/04* (2013.01); *H04W 4/40* (2018.02); *H04W 4/50* (2018.02)

(58) Field of Classification Search
CPC ..... H04W 8/245; H04W 36/14; H04W 24/00; H04W 52/0225; H04W 76/10; H04W 72/0445; H04W 28/102; H04W 4/50
(Continued)

(56) References Cited

U.S. PATENT DOCUMENTS 7,006,528 B1 * 2/2006 Kokkinen ............... H04L 29/06
                                                         370/467
7,953,457 B2 * 5/2011 Salomone ......... H04W 52/0225
                                                         455/574
(Continued)

FOREIGN PATENT DOCUMENTS

CN    102148679 A    8/2011
CN    106026964 A    10/2016
(Continued)

OTHER PUBLICATIONS

Y. Yang and K. Hua, "Emerging Technologies for 5G-Enabled Vehicular Networks," in IEEE Access, vol. 7, pp. 181117-181141, 2019, doi: 10.1109/ACCESS. Nov. 2019.2954466. (Year: 2019).*
(Continued)

*Primary Examiner* — William D Cumming
(74) *Attorney, Agent, or Firm* — Fish & Richardson P.C.

(57) ABSTRACT

A communication method, includes: a terminal device receives a first-standard vehicle-to-everything V2X sidelink configuration and a second-standard V2X sidelink configuration from a network device, obtains based on the first-standard V2X sidelink configuration and the second-standard V2X sidelink configuration, a V2X sidelink resource used for data transmission; and communicates with another terminal device on the V2X sidelink resource.

18 Claims, 4 Drawing Sheets

(58) Field of Classification Search
USPC ..... 370/466, 457, 278, 352, 242; 455/552.1, 455/574, 467

See application file for complete search history.

(56) References Cited

U.S. PATENT DOCUMENTS

| | | | | |
|---|---|---|---|---|
| 9,072,078 | B2* | 6/2015 | Hsieh | H04W 76/10 |
| 2004/0032880 | A1* | 2/2004 | Leung | H04W 8/245 |
| | | | | 370/466 |
| 2005/0090283 | A1* | 4/2005 | Rodriquez | H04L 67/12 |
| | | | | 455/552.1 |
| 2006/0037807 | A1 | 2/2006 | Hongo et al. | |
| 2006/0133301 | A1* | 6/2006 | Bhatia | H04L 61/6059 |
| | | | | 370/278 |
| 2007/0089161 | A1* | 4/2007 | Waris | H04W 36/14 |
| | | | | 726/1 |
| 2009/0238172 | A1* | 9/2009 | Tanizawa | H04M 7/0024 |
| | | | | 370/352 |
| 2009/0303885 | A1* | 12/2009 | Longo | H04W 24/00 |
| | | | | 370/242 |
| 2017/0164349 | A1 | 6/2017 | Zhu et al. | |
| 2017/0285177 | A1 | 10/2017 | Jin et al. | |
| 2018/0098323 | A1 | 4/2018 | Zhang et al. | |
| 2018/0234973 | A1* | 8/2018 | Lee | H04W 72/0446 |
| 2019/0394786 | A1* | 12/2019 | Parron | H04L 27/0006 |
| 2020/0229195 | A1* | 7/2020 | Lien | H04L 5/0098 |
| 2021/0120528 | A1* | 4/2021 | Peng | H04W 4/50 |

FOREIGN PATENT DOCUMENTS

| | | | | |
|---|---|---|---|---|
| CN | 107295466 | A | | 10/2017 |
| CN | 107959708 | A | | 4/2018 |
| EP | 3836694 | A1 * | 6/2021 | ............ H04W 28/02 |
| WO | 2016122589 | A1 | | 8/2016 |
| WO | 2016148399 | A1 | | 9/2016 |
| WO | 2017128454 | A1 | | 8/2017 |
| WO | 2017135998 | A1 | | 8/2017 |
| WO | 2017155344 | A1 | | 9/2017 |
| WO | WO-2021062805 | A1 * | 4/2021 | |

OTHER PUBLICATIONS

English machine translation of WO 2016/148399 Google Dec. 2021 (Year: 2021).*

"IEEE Standard for Wireless Access in Vehicular Environments (WAVE)—Networking Services—Redline," in IEEE Std 1609.3-2020 (Revision of IEEE Std 1609.3-2016)—Redline , vol., no., pp. 1-344, Mar. 9, 2021. (Year: 2021).*

Office Action issued in Chinese Application No. 201810680516.3 dated Aug. 9, 2021, 15 pages.

Office Action issued in Indian Application No. 202027055811 dated Jul. 13, 2021, 5 pages.

3GPP TR 23.786 V0.6.0 (Jun. 2018), "3rd Generation Partnership Project; Technical Specification Group Services and System Aspects; Study on architecture enhancements for EPS and 5G System to support advanced V2X services (Release 16)," Jun. 2018, 51 pages.

Extended European Search Report issued in European Application No. 19824476.6 dated Mar. 19, 2021, 11 pages.

LG Electronics Inc., Coexistence with DSRC. 3GPP TSG-RAN WG2 Meeting #101 bis, Sanya, China, Apr. 16-20, 2018, R2-1805882, 2 pages.

Lianghai et al., "Applying Multiradio Access Technologies for Reliability Enhancement in Vehicle to Everything Communication," IEEE Access, vol. 6, Apr. 23, 2018, 16 pages.

PCT International Search Report and Written Opinion issued in International Application No. PCT/CN2019/092976 dated Sep. 4, 2019, 16 pages (with English translation).

Chengxiang et al., "Discussion on Network Requirements,Architecture and Evolution of 5G Bearer Network," Designing Techniques of Posts and Telecommunications, May 2018, 4 pages (with English abstract).

Office Action issued in Chinese Application No. 201810680516.3 dated Mar. 15, 2022, 4 pages.

Ye et al., "Deep Reinforcement Learning Based Resource Allocation for V2V Communications," IEEE Transactions on Vehicular Technology, vol. 68, No. 4, Apr. 2019, 11 pages.

* cited by examiner

V2X SIDELINK COMMUNICATION

CROSS-REFERENCE TO RELATED APPLICATIONS

This application is a continuation of International Application No. PCT/CN2019/092976, filed on Jun. 26, 2019, which claims priority to Chinese Patent Application No. 201810680516.3, filed on Jun. 27, 2018. The disclosures of the aforementioned applications are herein incorporated by reference in their entireties.

TECHNICAL FIELD

Embodiments of this application relate to the field of communications technologies, and in particular, to a communication method, an apparatus, and a storage medium.

BACKGROUND

A vehicle-to-everything (vehicle to everything, V2X) service is a type of communications service for which a vehicle-to-vehicle (vehicle to vehicle, V2V) application is used, and is usually transmitted through the 3rd generation partnership project (3rd Generation Partnership Project, 3GPP) system. V2X includes a vehicle-to-infrastructure (vehicle to infrastructure, V2I) service, a vehicle-to-network (vehicle to network, V2N) service, a vehicle-to-pedestrian (vehicle to pedestrian, V2P) service, and a vehicle-to-vehicle (vehicle to vehicle, V2V) service.

In an existing long term evolution (Long Term Evolution, LTE) technology, that LTE V2X is used to support a V2X service has been defined, but an existing LTE base station can provide a service for only an LTE V2X service. After new radio (New Radio, NR) is introduced, how to enable a terminal device to obtain both an LTE V2X service and an NR V2X service is a technical problem that urgently needs to be resolved currently.

SUMMARY

Embodiments of this application provide a communication method, an apparatus, and a storage medium, to ensure that a same terminal device can obtain a first-standard V2X service and a second-standard V2X service.

A first aspect of this application provides a communication method, including:

sending, by a network device, a first-standard V2X sidelink configuration and/or a second-standard V2X sidelink configuration to a first terminal device; obtaining, by the first terminal device based on the first-standard V2X sidelink configuration and/or the second-standard V2X sidelink configuration, a V2X sidelink resource used for data transmission; and communicating, by the first terminal device, with a second terminal device on the V2X sidelink resource.

In this solution, a first-standard V2X service may be an LTE V2X service, or may be an NR V2X service. Correspondingly, a second-standard V2X service may be an NR V2X service, or may be an LTE V2X service. For example, first-standard V2X and second-standard V2X may alternatively be wireless fidelity (wireless fidelity, Wi-Fi). Alternatively, different standards may alternatively be access technologies for which different spectrum resources, different encoding and decoding technologies, different subcarrier spacings, different transmission timings (transmission timing), different CP lengths, different modulation and demodulation technologies, or different transmission time intervals are used.

For example, a first standard is LTE, and a second standard is NR. The first-standard V2X sidelink configuration includes at least one of the following information: LTE V2X sidelink transmit resource information, LTE V2X sidelink receive resource information, an LTE V2X sidelink transmit power, an LTE V2X sidelink modulation and coding scheme (modulation and coding scheme, MCS), an LTE sidelink vehicle-to-everything radio network temporary identifier (sidelink-V2X-radio network temporary identifier, SL-V-RNTI), an LTE V2X synchronization type, and an LTE V2X synchronization configuration. The second-standard V2X sidelink configuration includes at least one of the following information: NR V2X sidelink receive resource information, NR V2X sidelink transmit resource information, an NR V2X sidelink transmit power, an NR V2X sidelink MCS, an NR SL-V-RNTI, an NR V2X synchronization type, and an NR V2X synchronization configuration.

In the foregoing solution, the first terminal device can obtain the first-standard V2X sidelink configuration and the second-standard V2X sidelink configuration from the network device, thereby determining, based on the foregoing two configurations, that the V2X sidelink resource used for data transmission is a first-standard V2X sidelink resource and/or a second-standard V2X sidelink resource, so that the first terminal device performs first-standard V2X service communication and/or second-standard V2X service communication with the second terminal device based on the determined V2X sidelink resource. In this way, it can be ensured that a same terminal device can obtain a first-standard V2X service and a second-standard V2X service.

For example, a V2X service may be, for example, an IP, a non-IP, V2V, V2I, V2N, V2P, a provider service identifier (provider service identifier, PSID), or an intelligent transport systems application identifier (intelligent transport systems application identifier, ITS-AID).

Optionally, the method further includes:

sending, by the first terminal device to the network device, information indicating that the first terminal device supports a first-standard V2X service and information indicating that the first terminal device supports a second-standard V2X service.

For example, the information indicating that the first terminal device supports the first-standard V2X service and the information indicating that the first terminal device supports the second-standard V2X service may be capability indication information indicating that the first terminal device supports the first-standard V2X service and capability indication information indicating that the first terminal device supports the second-standard V2X service.

In the foregoing solution, because the first terminal device sends the information indicating that the first terminal device supports the first-standard V2X service and the information indicating that the first terminal device supports the second-standard V2X service to the network device, the network device may selectively send the first-standard V2X sidelink configuration and/or the second-standard V2X sidelink configuration to the first terminal device based on the foregoing information, so that a network resource can be saved.

Optionally, the obtaining a V2X sidelink resource used for data transmission includes:

receiving, by the first terminal device, a first message broadcast by the network device, where the first message may include any one, any two, or all of the following: an identifier of an area, a first-standard V2X sidelink configuration corresponding to the area, and a second-standard V2X sidelink configuration corresponding to the area, the first-standard V2X sidelink configuration includes available first-standard V2X sidelink resources, and the second-standard V2X sidelink configuration includes available second-standard V2X sidelink resources; and selecting, by the first terminal device, at least one of the available first-standard V2X sidelink resources and/or at least one of the available second-standard V2X sidelink resources when the first terminal device is currently in the area.

For example, the first message may include only any one of the identifier of the area, the first-standard V2X sidelink configuration corresponding to the area, and the second-standard V2X sidelink configuration corresponding to the area. Alternatively, the first message may include any two of the identifier of the area, the first-standard V2X sidelink configuration corresponding to the area, and the second-standard V2X sidelink configuration corresponding to the area. For example, the first message includes the identifier of the area and the first-standard V2X sidelink configuration corresponding to the area. Alternatively, the first message includes the identifier of the area and the second-standard V2X sidelink configuration corresponding to the area. Alternatively, the first message includes the first-standard V2X sidelink configuration corresponding to the area and the second-standard V2X sidelink configuration corresponding to the area. Alternatively, the first message may include all of the identifier of the area, the first-standard V2X sidelink configuration corresponding to the area, and the second-standard V2X sidelink configuration corresponding to the area.

In this solution, when determining an area in which the first terminal device is located, the first terminal device can select a resource from available resources corresponding to the area, to transmit data. For example, the first terminal device may select the at least one of the available first-standard V2X sidelink resources as the V2X sidelink resource, to transmit data; may select the at least one of the available second-standard V2X sidelink resources as the V2X sidelink resource, to transmit data; or may select the at least one of the available first-standard V2X sidelink resources and the at least one of the available second-standard V2X sidelink resources as the V2X sidelink resources, to transmit data.

For example, the network device broadcasts a plurality of available resources for the area, and the first terminal device selects one or more available resources from the plurality of available resources broadcast by the network device. For example, when performing carrier aggregation (carrier aggregation, CA), the first terminal device may select two or more available resources.

In the foregoing solution, when broadcasting a message to the first terminal device, the network device can provide the V2X sidelink configurations in the two standards for the first terminal device. In this way, the first terminal device can obtain the V2X sidelink configurations in the two standards when the first terminal device is in an idle state, so that the first terminal device can also obtain the first-standard V2X service and the second-standard V2X service when the first terminal device is in the idle state.

Optionally, the obtaining a V2X sidelink resource used for data transmission includes:

sending, by the first terminal device, a second message to the network device, where the second message carries at least one piece of information used to indicate a network standard; and receiving, by the first terminal device, the V2X sidelink resource sent by the network device based on the network standard.

In this solution, the first terminal device sends the second message to the network device. The second message includes information used to indicate a sidelink radio access technology (radio access technology, RAT) type (type), for example, used to indicate whether the sidelink radio access technology type is the first standard or the second standard, or used to indicate both the first standard and the second standard. The second message may be a scheduling report (scheduling report, SR) or a buffer status report (buffer status report, BSR). When reporting the SR or the BSR, the first terminal device may use the SR or the BSR to carry the at least one piece of information used to indicate the network standard.

After receiving the second message sent by the first terminal device, the network device determines the V2X sidelink resource based on the information that is used to indicate the network standard and that is carried in the second message, and sends the V2X sidelink resource to the first terminal device.

In the foregoing solution, the first terminal device can send, to the network device, the information used to indicate the network standard. In this way, the network device sends the V2X sidelink resource to the first terminal device based on the network standard. Therefore, the first terminal device obtains the corresponding V2X sidelink resource according to an actual requirement.

Optionally, the obtaining a V2X sidelink resource used for data transmission includes:

receiving, by the first terminal device, a configuration rule sent by the network device, where the configuration rule includes any one, any two, any three, or all of the following information: a mapping relationship between a V2X service type and a resource, a mapping relationship between a quality of service QoS parameter and a resource, a quality of service QoS parameter threshold, and a sidelink quality threshold, and the sidelink quality threshold includes a first-standard V2X sidelink quality threshold and/or a second-standard V2X sidelink quality threshold; and determining, by the first terminal device, the V2X sidelink resource according to the configuration rule. In the foregoing solution, the configuration rule may include the any one, any two, any three, or all of the foregoing information. For example, the configuration rule may include the mapping relationship between a V2X service type and a resource and the sidelink quality threshold. In this case, the first terminal device measures a sidelink CBR. When the sidelink CBR obtained through measurement satisfies a threshold, the first terminal device executes a mapping relationship, configured by the network device, between a V2X service type and a resource, to be specific, selects the resource configured by the network device, to transmit a V2X service that belongs to the V2X service type. For another example, the configuration rule may include the mapping relationship between a QoS parameter and a resource and the sidelink quality threshold. In this case, the first terminal device measures a sidelink CBR. When the sidelink CBR obtained through measurement satisfies a threshold, the first terminal device executes a mapping relationship, configured by the network device, between a QoS parameter and a resource, to be specific, selects the resource configured by the network device, to transmit data having the QoS parameter. Satisfying the threshold may be that the CBR obtained through measurement is greater than the threshold, the CBR obtained through measurement is greater than or equal to the threshold, the CBR obtained through measurement is less than the threshold, or the CBR obtained through measurement is less than or equal to the threshold.

For example, the resource may be the first-standard V2X sidelink resource, may be the second-standard V2X sidelink resource, or may be the first-standard V2X sidelink resource and the second-standard V2X sidelink resource.

For example, the quality of service QoS parameter may include any one, any two, or all of the following information: a prose per-packet priority (prose per packet priority, PPPP), prose per-packet reliability (prose per packet reliability, PPPR), and quality of service flow indicator (QoS flow indicator, QFI). The quality of service flow indicator may alternatively be a 5QI (5G QoS Identifier) or a priority level (priority level).

For example, a sidelink quality parameter may include a channel busy ratio (Channel Busy Ratio, CBR).

When the configuration rule includes the mapping relationship between a V2X service type and a resource, the first terminal device obtains, based on a type of a V2X service that needs to be transmitted, a V2X sidelink resource corresponding to the type of the V2X service that needs to be transmitted.

After receiving the configuration rule sent by the network device, the first terminal device may determine the V2X sidelink resource according to the configuration rule. In this way, the first terminal device can obtain the first-standard V2X service and the second-standard V2X service based on the obtained V2X sidelink resource.

Optionally, the configuration rule includes the quality of service QoS parameter threshold, and the quality of service QoS parameter threshold includes a first prose per-packet priority PPPP threshold and/or a first prose per-packet reliability PPPR threshold; and the determining the V2X sidelink resource according to the configuration rule satisfies any one of the following:

if a PPPP of a to-be-sent data packet of the first terminal device is greater than or greater than or equal to the first PPPP threshold, and/or PPPR of the to-be-sent data packet is greater than or greater than or equal to the first PPPR threshold, determining that the V2X sidelink resource is a first-standard V2X sidelink resource;

if a PPPP of a to-be-sent data packet of the first terminal device is greater than or greater than or equal to the first PPPP threshold, and/or PPPR of the to-be-sent data packet is greater than or greater than or equal to the first PPPR threshold, determining that the V2X sidelink resource is a second-standard V2X sidelink resource;

if a PPPP of a to-be-sent data packet of the first terminal device is greater than or greater than or equal to the first PPPP threshold, and/or PPPR of the to-be-sent data packet is less than or less than or equal to the first PPPR threshold, determining that the V2X sidelink resource is a first-standard V2X sidelink resource;

if a PPPP of a to-be-sent data packet of the first terminal device is greater than or greater than or equal to the first PPPP threshold, and/or PPPR of the to-be-sent data packet is less than or less than or equal to the first PPPR threshold, determining that the V2X sidelink resource is a second-standard V2X sidelink resource;

if a PPPP of a to-be-sent data packet of the first terminal device is less than or less than or equal to the first PPPP threshold, and/or PPPR of the to-be-sent data packet is less than or less than or equal to the first PPPR threshold, determining that the V2X sidelink resource is a first-standard V2X sidelink resource;

if a PPPP of a to-be-sent data packet of the first terminal device is less than or less than or equal to the first PPPP threshold, and/or PPPR of the to-be-sent data packet is less than or less than or equal to the first PPPR threshold, determining that the V2X sidelink resource is a second-standard V2X sidelink resource;

if a PPPP of a to-be-sent data packet of the first terminal device is less than or less than or equal to the first PPPP threshold, and/or PPPR of the to-be-sent data packet is greater than or greater than or equal to the first PPPR threshold, determining that the V2X sidelink resource is a first-standard V2X sidelink resource; or if a PPPP of a to-be-sent data packet of the first terminal device is less than or less than or equal to the first PPPP threshold, and/or PPPR of the to-be-sent data packet is greater than or greater than or equal to the first PPPR threshold, determining that the V2X sidelink resource is a second-standard V2X sidelink resource.

In the foregoing solution, for example, according to an existing standard, a smaller PPPP value indicates a higher priority of the to-be-sent data packet. Assuming that a smaller PPPR value indicates a higher reliability requirement of the to-be-sent data, and it is considered that the first-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is greater than or greater than or equal to the first PPPR threshold, it is determined that the V2X sidelink resource is the first-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a smaller PPPR value indicates a higher reliability requirement of the to-be-sent data, and it is considered that the second-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is greater than or greater than or equal to the first PPPR threshold, it is determined that the V2X sidelink resource is the second-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a larger PPPR value indicates a higher reliability requirement of the to-be-sent data, and it is considered that the first-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is less than or less than or equal to the first PPPR threshold, it is determined that the V2X sidelink resource is the first-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a larger PPPR value indicates a higher reliability requirement of the to-be-sent data, and it is considered that the second-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is less than or less than or equal to the first PPPR threshold, it is determined that the V2X sidelink resource is the second-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a smaller PPPR value indicates a higher reliability requirement of the to-be-sent data, and it is considered that the first-standard V2X sidelink resource may be used for transmission of data having a higher priority and/or a higher reliability requirement, when the PPPP of the to-be-sent data packet is less than or less than or equal to the first PPPP threshold, and/or when the PPPR of the data packet is less than or less than or equal to the first PPPR threshold, it is determined that the V2X sidelink resource is the first-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a smaller PPPR value indicates a higher reliability requirement of the to-be-sent data, and it is considered that the second-standard V2X sidelink resource may be used for transmission of data having a higher priority and/or a higher reliability requirement, when the PPPP of the to-be-sent data packet is less than or less than or equal to the first PPPP threshold, and/or when the PPPR of the data packet is less than or less than or equal to the first PPPR threshold, it is determined that the V2X sidelink resource is the second-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a larger PPPR value indicates a higher reliability requirement of the to-be-sent data, and it is considered that the first-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is greater than or greater than or equal to the first PPPR threshold, it is determined that the V2X sidelink resource is the first-standard V2X sidelink resource. In this way, the terminal device can select a proper V2X resource to satisfy a QoS requirement of the data packet.

For example, according to an existing standard, a smaller PPPP value indicates a higher priority of the to-be-sent data packet. Assuming that a larger PPPR value indicates a higher reliability requirement of the to-be-sent data, and it is considered that the second-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is greater than or greater than or equal to the first PPPR threshold, it is determined that the V2X sidelink resource is the second-standard V2X sidelink resource. In this way, the terminal device can select a proper V2X resource to satisfy a QoS requirement of the data packet.

Optionally, the quality of service QoS parameter threshold further includes a second PPPP threshold and/or a second PPPR threshold; and the determining the V2X sidelink resource according to the configuration rule satisfies either of the following:

if the PPPP of the to-be-sent data packet of the first terminal device is less than or less than or equal to the second PPPP threshold, and/or the PPPR of the to-be-sent data packet is greater than or greater than or equal to the second PPPR threshold, determining that the V2X sidelink resources are the first-standard V2X sidelink resource and the second-standard V2X sidelink resource; or if the PPPP of the to-be-sent data packet of the first terminal device is less than or less than or equal to the second PPPP threshold, and/or the PPPR of the to-be-sent data packet is less than or less than or equal to the second PPPR threshold, determining that the V2X sidelink resources are the first-standard V2X sidelink resource and the second-standard V2X sidelink resource.

In this solution, according to the existing standard, the smaller PPPP value indicates the higher priority of the to-be-sent data packet. Assuming that the larger PPPR value indicates the higher reliability requirement of the to-be-sent data, and it is considered that using both the first-standard V2X sidelink resource and the second-standard V2X sidelink resource for transmission can satisfy a high priority requirement and/or a high reliability requirement of data, when the PPPP of the to-be-sent data packet is less than or less than or equal to the second PPPP threshold, and/or the PPPR of the to-be-sent data packet is greater than or greater than or equal to the second PPPR threshold, it is determined that the V2X sidelink resources are the first-standard V2X sidelink resource and the second-standard V2X sidelink resource. In this way, when the terminal device needs to transmit the data having the high priority requirement and/or the high reliability requirement, the terminal device can obtain the corresponding V2X sidelink resources to satisfy a QoS requirement of the data packet.

For example, according to the existing standard, the smaller PPPP value indicates the higher priority of the to-be-sent data packet. Assuming that the smaller PPPR value indicates the higher reliability requirement of the to-be-sent data, and it is considered that using both the first-standard V2X sidelink resource and the second-standard V2X sidelink resource for transmission can satisfy a high priority requirement and/or a high reliability requirement of data, when the PPPP of the to-be-sent data packet is less than or less than or equal to the second PPPP threshold, and/or the PPPR of the to-be-sent data packet is less than or less than or equal to the second PPPR threshold, it is determined that the V2X sidelink resources are the first-standard V2X sidelink resource and the second-standard V2X sidelink resource. In this way, when the terminal device needs to transmit the data having the high priority requirement and/or the high reliability requirement, the terminal device can obtain the corresponding V2X sidelink resources to satisfy a QoS requirement of the data packet.

Optionally, the configuration rule includes the quality of service QoS parameter threshold, and the quality of service QoS parameter threshold includes a first quality of service flow indicator QFI threshold; and the determining the V2X sidelink resource according to the configuration rule satisfies any one of the following:

if a QFI of a to-be-sent data packet of the first terminal device is greater than or greater than or equal to the first QFI threshold, determining that the V2X sidelink resource is a first-standard V2X sidelink resource;

if a QFI of a to-be-sent data packet of the first terminal device is greater than or greater than or equal to the first QFI threshold, determining that the V2X sidelink resource is a second-standard V2X sidelink resource;

if a QFI of a to-be-sent data packet of the first terminal device is less than or less than or equal to the first QFI threshold, determining that the V2X sidelink resource is a first-standard V2X sidelink resource; or if a QFI of a to-be-sent data packet of the first terminal device is less than or less than or equal to the first QFI threshold, determining that the V2X sidelink resource is a second-standard V2X sidelink resource.

In this solution, for example, the to-be-sent data packet of the first terminal device has the corresponding QFI. If the QFI of the to-be-sent data packet is greater than or greater than or equal to the first QFI threshold, it is determined that the V2X sidelink resource is the first-standard V2X sidelink resource. In this way, if a smaller QFI value indicates a higher QoS requirement, and it is considered that the first-standard V2X sidelink resource may be used to transmit data having a lower QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is greater than or greater than or equal to the first QFI threshold, it is determined that the V2X sidelink resource is the second-standard V2X sidelink resource. In this way, if a smaller QFI value indicates a higher QoS requirement, and it is considered that the second-standard V2X sidelink resource may be used to transmit data having a lower QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is less than or less than or equal to the first QFI threshold, it is determined that the V2X sidelink resource is the first-standard V2X sidelink resource. In this way, if a smaller QFI value indicates a higher QoS requirement, and it is considered that the first-standard V2X sidelink resource may be used to transmit data having a higher QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is less than or less than or equal to the first QFI threshold, it is determined that the V2X sidelink resource is the second-standard V2X sidelink resource. In this way, if a smaller QFI value indicates a higher QoS requirement, and it is considered that the second-standard V2X sidelink resource may be used to transmit data having a higher QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is greater than or greater than or equal to the first QFI threshold, it is determined that the V2X sidelink resource is the first-standard V2X sidelink resource. In this way, if a larger QFI value indicates a higher QoS requirement, and it is considered that the first-standard V2X sidelink resource may be used to transmit data having a higher QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is greater than or greater than or equal to the first QFI threshold, it is determined that the V2X sidelink resource is the second-standard V2X sidelink resource. In this way, if a larger QFI value indicates a higher QoS requirement, and it is considered that the second-standard V2X sidelink resource may be used to transmit data having a higher QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is less than or less than or equal to the first QFI threshold, it is determined that the V2X sidelink resource is the first-standard V2X sidelink resource. In this way, if a larger QFI value indicates a higher QoS requirement, and it is considered that the first-standard V2X sidelink resource may be used to transmit data having a lower QoS requirement, the terminal device can select, according to the foregoing rule, appropriate V2X sidelink resources for data having different QoS requirements, to transmit the data.

For example, the to-be-sent data packet of the first terminal device has the corresponding QFI. If the QFI of the to-be-sent data packet is less than or less than or equal to the first QFI threshold, it is determined that the V2X sidelink resource is the second-standard V2X sidelink resource. In this way, if a larger QFI value indicates a higher QoS requirement, and it is considered that the second-standard V2X sidelink resource may be used to transmit data having a lower QoS requirement, the terminal device can select, according to the foregoing rule, appropriate V2X sidelink resources for data having different QoS requirements, to transmit the data.

Optionally, the quality of service QoS parameter threshold includes a second quality of service flow indicator QFI threshold; and the determining the V2X sidelink resource according to the configuration rule satisfies either of the following:

if the QFI of the to-be-sent data packet of the first terminal device is greater than or greater than or equal to the second QFI threshold, determining that the V2X sidelink resources are the first-standard V2X sidelink resource and the second-standard V2X sidelink resource; or if the QFI of the to-be-sent data packet of the first terminal device is less than or less than or equal to the second QFI threshold, determining that the V2X sidelink resources are the first-standard V2X sidelink resource and the second-standard V2X sidelink resource.

In this solution, the to-be-sent data packet of the first terminal device has the corresponding QFI. If the QFI of the to-be-sent data packet is greater than or greater than or equal to the second QFI threshold, it is determined that the V2X sidelink resource is the first-standard V2X sidelink resource and the second-standard V2X sidelink resource. In this way, if the larger QFI value indicates the higher QoS requirement, and it is considered that using both the first-standard V2X sidelink resource and the second-standard V2X sidelink resource can satisfy a high QoS requirement of data, an appropriate V2X sidelink resource may be selected, according to the foregoing method, for the data having the high QoS requirement, to transmit the data.

For example, the to-be-sent data packet of the first terminal device has the corresponding QFI. If the QFI of the to-be-sent data packet is less than or less than or equal to the second QFI threshold, it is determined that the V2X sidelink resource is the first-standard V2X sidelink resource and the second-standard V2X sidelink resource. In this way, if the smaller QFI value indicates the higher QoS requirement, and it is considered that using both the first-standard V2X sidelink resource and the second-standard V2X sidelink resource can satisfy a high QoS requirement of data, an appropriate V2X sidelink resource may be selected, according to the foregoing method, for the data having the high QoS requirement, to transmit the data.

Optionally, the configuration rule includes the sidelink quality threshold, and the sidelink quality threshold includes a first channel busy ratio CBR threshold and/or a second CBR threshold; and the determining the V2X sidelink resource according to the configuration rule satisfies either of the following:

if a first-standard V2X sidelink CBR obtained by the first terminal device through measurement is greater than or greater than or equal to the first CBR threshold, and/or a second-standard V2X sidelink CBR obtained by the first terminal device through measurement is less than or less than or equal to the second CBR threshold, determining that the V2X sidelink resource is a second-standard V2X sidelink resource; or if a first-standard V2X sidelink CBR obtained by the first terminal device through measurement is less than or less than or equal to the first CBR threshold, and/or a second-standard V2X sidelink CBR obtained by the first terminal device through measurement is greater than or greater than or equal to the second CBR threshold, determining that the V2X sidelink resource is a first-standard V2X sidelink resource.

In the foregoing solution, when the first-standard V2X sidelink CBR obtained through measurement is greater than or greater than or equal to the first CBR threshold, it is determined that the V2X sidelink resource is the second-standard V2X sidelink resource. In this way, the terminal device can select an idler V2X sidelink resource in real time to transmit data.

For example, when the second-standard V2X sidelink CBR obtained through measurement is less than or less than or equal to the second CBR threshold, it is determined that the V2X sidelink resource is the second-standard V2X sidelink resource. In this way, the terminal device can select an idler V2X sidelink resource in real time to transmit data.

For example, when the first-standard V2X sidelink CBR obtained through measurement is greater than or greater than or equal to the first CBR threshold, and/or the second-standard V2X sidelink CBR obtained by the first terminal device through measurement is less than or less than or equal to the second CBR threshold, it is determined that the V2X sidelink resource is the second-standard V2X sidelink resource. In this way, the terminal device can select an idler V2X sidelink resource in real time to transmit data.

Optionally, the method further includes:

receiving, by the first terminal device, a measurement event sent by the network device; and the measurement event includes any one of the following:

a first-standard V2X sidelink channel busy ratio SL CBR is greater than or greater than or equal to a second threshold, and/or a second-standard V2X SL CBR is less than or less than or equal to a third threshold;

a first-standard V2X SL CBR is less than or less than or equal to a fourth threshold, and/or a second-standard V2X SL CBR is greater than or greater than or equal to a fifth threshold;

a first-standard V2X SL CBR or a second-standard V2X SL CBR is greater than or greater than or equal to a sixth threshold, and a reference signal received power RSRP or reference signal received quality RSRQ is greater than or greater than or equal to a seventh threshold; or a first-standard V2X SL CBR or a second-standard V2X SL CBR is less than or less than or equal to an eighth threshold, and a RSRP or RSRQ is less than or less than or equal to a ninth threshold.

In this solution, to make the V2X sidelink resource determined by the network device more proper, the network device may be enabled to learn of statuses of the first-standard V2X sidelink resource and the second-standard V2X sidelink resource that can be obtained by the first terminal device, and even the network device may provide Uu interface selection for the first terminal device. The network device delivers a measurement configuration to the first terminal device, and the first terminal device measures V2X sidelinks after receiving the measurement configuration sent by the network device. The measurement configuration may include the measurement event. When a measurement result of a first-standard V2X sidelink and/or a measurement result of a second-standard V2X sidelink that are/is obtained by the first terminal device through measurement satisfy/satisfies the event, the first terminal device may send a measurement report to the network device. The measurement report includes the measurement result of the first-standard V2X sidelink and/or the measurement result of the second-standard V2X sidelink. Optionally, the measurement report includes the measurement result of the first-standard V2X sidelink and/or the measurement result of the second-standard V2X sidelink that satisfy/satisfies the measurement event. The network device allocates the V2X sidelink resource to the first terminal device based on the measurement report sent by the first terminal device.

Optionally, the method further includes:

obtaining, by the first terminal device, information indicating that the second terminal device supports the first-standard V2X service and information indicating that the second terminal device supports the second-standard V2X service; and selecting, by the first terminal device, the V2X sidelink resource based on the information indicating that the second terminal device supports the first-standard V2X service and the information indicating that the second terminal device supports the second-standard V2X service.

In this solution, before selecting the V2X sidelink resource, the first terminal device first learns of whether the second terminal device can support the first-standard V2X service, whether the second terminal device can support the second-standard V2X service, or whether the second terminal device can support both the first-standard V2X service and the second-standard V2X service. In an implementation process, the first terminal device may obtain, by using a V2X control function (control function), from the network device, or by using an application (application, APP) installed in the first terminal device, whether the second terminal device can support the first-standard V2X service, whether the second terminal device can support the second-standard V2X service, or whether the second terminal device can support both the first-standard V2X service and the second-standard V2X service.

When learning of that the second terminal device can support both the first-standard V2X service and the second-standard V2X service, the first terminal device selects the V2X sidelink resource in the foregoing manner, so that the selected resource is more proper.

Optionally, if the first terminal device learns of that the second terminal device can support only the first-standard V2X service, correspondingly, the first terminal device selects the first-standard V2X sidelink resource. If the first terminal device learns of that the second terminal device can support only the second-standard V2X service, correspondingly, the first terminal device may select the second-standard V2X sidelink resource.

Optionally, the method further includes:

sending, by the first terminal device, a device identifier of the second terminal device to the network device, where the device identifier is used to indicate the network device to allocate the V2X sidelink resource to the first terminal device, or is used by the first terminal device to obtain, from the network device, the information indicating that the second terminal device supports the first-standard V2X service and the information indicating that the second terminal device supports the second-standard V2X service.

In this solution, the network device receives the device identifier, sent by the first terminal device, of the second terminal device. The network device obtains, based on the device identifier, the information indicating that the second terminal device supports the first-standard V2X service and the information indicating that the second terminal device supports the second-standard V2X service, and determines the V2X sidelink resource based on the information indicating that the second terminal device supports the first-standard V2X service and the information indicating that the second terminal device supports the second-standard V2X service, so that the selected resource is more proper.

Optionally, a first V2X sidelink and a second V2X sidelink use a same V2X synchronization type and a same SL-V-RNTI.

In this solution, because both an LTE V2X sidelink and an NR V2X sidelink are managed by the network device, a portion of configurations of the LTE V2X sidelink may be the same as those of the NR V2X sidelink. For example, an SL-V-RNTI and a V2X synchronization type may be common configurations. To be specific, the SL-V-RNTI and the V2X synchronization type are not configured by distinguishing between LTE and NR.

Because the first V2X sidelink and the second V2X sidelink use the same V2X synchronization type and the same SL-V-RNTI, the first V2X sidelink configuration and the second V2X sidelink configuration can be simplified.

In this case, the first-standard V2X sidelink configuration and the second-standard V2X sidelink configuration may include the LTE V2X sidelink transmit resource information, the LTE V2X sidelink receive resource information, the LTE V2X sidelink transmit power, the LTE V2X sidelink MCS, the LTE V2X synchronization configuration, the NR V2X sidelink receive resource information, the NR V2X sidelink transmit resource information, the NR V2X sidelink transmit power, the NR V2X sidelink MCS, the NR V2X synchronization configuration, the common SL-V-RNTI, and the common synchronization type.

Optionally, the method further includes:

obtaining, by the network device, any one or more of the following information: information indicating that the first terminal device supports a first-standard V2X service, information indicating that the first terminal device supports a second-standard V2X service, grant information of the first terminal device, and sidelink aggregate maximum bit rates AMBRs of the first terminal device, where the sidelink AMBRs include a first-standard V2X sidelink AMBR and a second-standard V2X sidelink AMBR; and the sending, by a network device, a first-standard V2X sidelink configuration and/or a second-standard V2X sidelink configuration to a first terminal device includes:

sending, by the network device, the first-standard V2X sidelink configuration and/or the second-standard V2X sidelink configuration to the first terminal device based on the any one or more of the information indicating that the first terminal device supports the first-standard V2X service, the information indicating that the first terminal device supports the second-standard V2X service, the grant information, and the sidelink AMBRs.

In the foregoing solution, the sidelink (sidelink) AMBRs may include the first-standard V2X sidelink (sidelink) AMBR and the second-standard V2X sidelink (sidelink) AMBR. The sidelink (sidelink) AMBR is a maximum bit rate when the terminal device performs sidelink communication for a V2X service.

For example, the grant information may include at least one of the following information: whether the first terminal device is granted as a first-standard vehicle (Vehicle) terminal device, whether the first terminal device is granted as a first-standard pedestrian (Pedestrian) terminal device, whether the first terminal device is granted as a second-standard vehicle (Vehicle) terminal device, and whether the first terminal device is granted as a second-standard pedestrian (Pedestrian) terminal device.

The network device sends the first-standard V2X sidelink configuration and/or the second-standard V2X sidelink configuration to the first terminal device based on the any one or more of the information indicating that the first terminal device supports the first-standard V2X service, the information indicating that the first terminal device supports the second-standard V2X service, the grant information, and the sidelink AMBRs, so that the first terminal device obtains the V2X sidelink resource used for data transmission, and it can be ensured that a same terminal device can obtain the first-standard V2X service and the second-standard V2X service.

Optionally, the method further includes:

broadcasting, by the network device, a first message to the first terminal device, where the first message may include any one, any two, or all of the following: an identifier of an area, a first-standard V2X sidelink configuration corresponding to the area, and a second-standard V2X sidelink configuration corresponding to the area, the first-standard V2X sidelink configuration includes available first-standard V2X sidelink resources, the second-standard V2X sidelink configuration includes available second-standard V2X sidelink resources, and the identifier of the area is used to indicate the first terminal device to select at least one of the available first-standard V2X sidelink resources and/or at least one of the available second-standard V2X sidelink resources when the first terminal device is currently in the area.

For example, the first message may include only any one of the identifier of the area, the first-standard V2X sidelink configuration corresponding to the area, and the second-standard V2X sidelink configuration corresponding to the area. Alternatively, the first message may include any two of the identifier of the area, the first-standard V2X sidelink configuration corresponding to the area, and the second-standard V2X sidelink configuration corresponding to the area. For example, the first message includes the identifier of the area and the first-standard V2X sidelink configuration corresponding to the area. Alternatively, the first message includes the identifier of the area and the second-standard V2X sidelink configuration corresponding to the area. Alternatively, the first message includes the first-standard V2X sidelink configuration corresponding to the area and the second-standard V2X sidelink configuration corresponding to the area. Alternatively, the first message may include all of the identifier of the area, the first-standard V2X sidelink configuration corresponding to the area, and the second-standard V2X sidelink configuration corresponding to the area.

In this solution, when determining an area in which the first terminal device is located, the first terminal device can select a resource from available resources corresponding to the area, to transmit data. For example, the first terminal device may select the at least one of the available first-standard V2X sidelink resources as the V2X sidelink resource, to transmit data; may select the at least one of the available second-standard V2X sidelink resources as the V2X sidelink resource, to transmit data; or may select the at least one of the available first-standard V2X sidelink resources and the at least one of the available second-standard V2X sidelink resources as the V2X sidelink resources, to transmit data.

For example, the network device broadcasts a plurality of available resources for the area, and the first terminal device selects one or more available resources from the plurality of available resources broadcast by the network device. For example, when performing carrier aggregation (carrier aggregation, CA), the first terminal device may select two or more available resources.

In the foregoing solution, when broadcasting a message to the first terminal device, the network device can provide the V2X sidelink configurations in the two standards for the first terminal device. In this way, the first terminal device can obtain the V2X sidelink configurations in the two standards when the first terminal device is in an idle state, so that the first terminal device can also obtain the first-standard V2X service and the second-standard V2X service when the first terminal device is in the idle state.

Optionally, the method further includes:
receiving, by the network device, a second message sent by the first terminal device, where the second message carries at least one piece of information used to indicate a network standard;
determining, by the network device, the V2X sidelink resource based on the network standard; and
sending, by the network device, the V2X sidelink resource to the first terminal device.

In this solution, the first terminal device sends the second message to the network device. The second message includes information used to indicate a sidelink radio access technology (radio access technology, RAT) type (type), for example, used to indicate whether the sidelink radio access technology type is the first network standard or the second network standard, or used to indicate both the first network standard and the second network standard. The second message may be a scheduling report (scheduling report, SR) or a buffer status report (buffer status report, BSR). When reporting the SR or the BSR, the first terminal device may use the SR or the BSR to carry the at least one piece of information used to indicate the network standard.

After receiving the second message sent by the first terminal device, the network device determines the V2X sidelink resource based on the information that is used to indicate the network standard and that is carried in the second message, and sends the V2X sidelink resource to the first terminal device.

In the foregoing solution, the first terminal device can send, to the network device, the information used to indicate the network standard. In this way, the network device sends the V2X sidelink resource to the first terminal device based on the network standard. Therefore, the first terminal device obtains the corresponding V2X sidelink resource according to an actual requirement.

Optionally, the method further includes:
sending, by the network device, a configuration rule to the first terminal device, where the configuration rule includes any one, any two, any three, or all of the following information: a mapping relationship between a V2X service type and a resource, a mapping relationship between a quality of service QoS parameter and a resource, a quality of service QoS parameter threshold, and a sidelink quality threshold, the sidelink quality threshold includes a first-standard V2X sidelink quality threshold and/or a second-standard V2X sidelink quality threshold, and the configuration rule is used to indicate the first terminal device to determine the V2X sidelink resource.

In the foregoing solution, the configuration rule may include the any one, any two, any three, or all of the foregoing information. For example, the configuration rule may include the mapping relationship between a V2X service type and a resource and the sidelink quality threshold. In this case, the first terminal device measures an LTE/NR V2X SL CBR. When the LTE/NR V2X SL CBR satisfies a threshold, the first terminal device executes a mapping relationship, configured by the network device, between a service type or a QoS parameter and a resource.

For example, the resource may be the first-standard V2X sidelink resource, may be the second-standard V2X sidelink resource, or may be the first-standard V2X sidelink resource and the second-standard V2X sidelink resource.

For example, the quality of service QoS parameter may include any one, any two, or all of the following information: a prose per-packet priority (prose per packet priority, PPPP), prose per-packet reliability (prose per packet reliability, PPPR), and quality of service flow indicator (QoS flow indicator, QFI).

For example, a sidelink quality parameter may include a channel busy ratio (Channel Busy Ratio, CBR).

When the configuration rule includes the mapping relationship between a V2X service type and a resource, the first terminal device obtains, based on a type of a V2X service that needs to be transmitted, a V2X sidelink resource corresponding to the type of the V2X service that needs to be transmitted.

After receiving the configuration rule sent by the network device, the first terminal device may determine the V2X sidelink resource according to the configuration rule. In this way, the first terminal device can obtain the first-standard V2X service and the second-standard V2X service based on the obtained V2X sidelink resource.

Optionally, the method further includes:
sending, by the network device, a measurement event to the first terminal device;
receiving, by the network device, a measurement report sent by the first terminal device, where the measurement report is sent by the first terminal device when the first terminal device determines that the measurement event satisfies a preset condition;
determining, by the network device, the V2X sidelink resource based on the measurement report; and sending, by the network device, the V2X sidelink resource to the first terminal device.

Optionally, the measurement event includes any one of the following:

a first-standard V2X sidelink channel busy ratio SL CBR is greater than or greater than or equal to a second threshold, and/or a second-standard V2X SL CBR is less than or less than or equal to a third threshold;

a first-standard V2X SL CBR is less than or less than or equal to a fourth threshold, and/or a second-standard V2X SL CBR is greater than or greater than or equal to a fifth threshold;

a first-standard V2X SL CBR or a second-standard V2X SL CBR is greater than or greater than or equal to a sixth threshold, and a reference signal received power RSRP or reference signal received quality RSRQ is greater than or greater than or equal to a seventh threshold; or a first-standard V2X SL CBR or a second-standard V2X SL CBR is less than or less than or equal to an eighth threshold, and a RSRP or RSRQ is less than or less than or equal to a ninth threshold.

In this solution, if the first-standard V2X sidelink channel busy ratio SL CBR is greater than or greater than or equal to the second threshold, the second-standard V2X SL CBR is less than or less than or equal to the third threshold, or when the first-standard V2X sidelink channel busy ratio SL CBR is greater than or greater than or equal to the second threshold and the second-standard V2X SL CBR is less than or less than or equal to the third threshold, it is determined that the V2X sidelink resource is the second-standard V2X sidelink resource.

If the first-standard V2X SL CBR is less than or less than or equal to the fourth threshold, the second-standard V2X SL CBR is greater than or greater than or equal to the fifth threshold, or when the first-standard V2X SL CBR is less than or less than or equal to the fourth threshold and the second-standard V2X SL CBR is greater than or greater than or equal to the fifth threshold, it is determined that the V2X sidelink resource is the first-standard V2X sidelink resource.

If the first-standard V2X SL CBR is greater than or greater than or equal to the sixth threshold and the RSRP is greater than or greater than or equal to the seventh threshold, the second-standard V2X SL CBR is greater than or greater than or equal to the sixth threshold and the RSRP is greater than or greater than or equal to the seventh threshold, the first-standard V2X SL CBR is greater than or greater than or equal to the sixth threshold and the RSRQ is greater than or greater than or equal to the seventh threshold, or the second-standard V2X SL CBR is greater than or greater than or equal to the sixth threshold and the RSRQ is greater than or greater than or equal to the seventh threshold, it is determined that the V2X sidelink resource is a Uu interface resource.

If the first-standard V2X SL CBR is less than or less than or equal to the eighth threshold and the RSRP is less than or less than or equal to the ninth threshold, the first-standard V2X SL CBR is less than or less than or equal to the eighth threshold and the RSRQ is less than or less than or equal to the ninth threshold, the second-standard V2X SL CBR is less than or less than or equal to the eighth threshold and the RSRP is less than or less than or equal to the ninth threshold, or the second-standard V2X SL CBR is less than or less than or equal to the eighth threshold and the RSRQ is less than or less than or equal to the ninth threshold, it is determined that the V2X sidelink resource is the first-standard V2X sidelink resource.

If the first-standard V2X SL CBR is less than or less than or equal to the eighth threshold and the RSRP is less than or less than or equal to the ninth threshold, the first-standard V2X SL CBR is less than or less than or equal to the eighth threshold and the RSRQ is less than or less than or equal to the ninth threshold, the second-standard V2X SL CBR is less than or less than or equal to the eighth threshold and the RSRP is less than or less than or equal to the ninth threshold, or the second-standard V2X SL CBR is less than or less than or equal to the eighth threshold and the RSRQ is less than or less than or equal to the ninth threshold, it is determined that the V2X sidelink resource is the second-standard V2X sidelink resource.

If the first-standard V2X SL CBR is less than or less than or equal to a tenth threshold, and the second-standard V2X SL CBR is less than or less than or equal to an eleventh threshold, it is determined that the V2X sidelink resources are the first-standard V2X sidelink resource and the second-standard V2X sidelink resource.

Optionally, the method further includes:

receiving, by the network device, a device identifier, sent by the first terminal device, of the second terminal device;

obtaining, by the network device based on the device identifier, information indicating that the second terminal device supports the first-standard V2X service and information indicating that the second terminal device supports the second-standard V2X service; and determining, by the network device, the V2X sidelink resource based on the information indicating that the second terminal device supports the first-standard V2X service and the information indicating that the second terminal device supports the second-standard V2X service.

In this solution, the network device receives the device identifier, sent by the first terminal device, of the second terminal device. The network device obtains, based on the device identifier, the information indicating that the second terminal device supports the first-standard V2X service and the information indicating that the second terminal device supports the second-standard V2X service, and determines the V2X sidelink resource based on the information indicating that the second terminal device supports the first-standard V2X service and the information indicating that the second terminal device supports the second-standard V2X service, so that the selected resource is more proper.

Optionally, the method further includes:

sending, by the network device to the first terminal device, the information indicating that the second terminal device supports the first-standard V2X service and the information indicating that the second terminal device supports the second-standard V2X service.

In this solution, when learning of that the second terminal device can support both the first-standard V2X service and the second-standard V2X service, the first terminal device selects the V2X sidelink resource in the foregoing manner, so that the selected resource is more proper.

Optionally, the grant information includes at least one of the following information: whether the first terminal device is granted as a first-standard vehicle terminal device, whether the first terminal device is granted as a first-standard pedestrian terminal device, whether the first terminal device is granted as a second-standard vehicle terminal device, and whether the first terminal device is granted as a second-standard pedestrian terminal device.

Optionally, a first V2X sidelink and a second V2X sidelink use a same V2X synchronization type and a same SL-V-RNTI.

In this solution, because both an LTE V2X sidelink and an NR V2X sidelink are managed by the network device, a portion of configurations of the LTE V2X sidelink may be the same as those of the NR V2X sidelink. For example, an SL-V-RNTI and a V2X synchronization type may be common configurations. To be specific, the SL-V-RNTI and the V2X synchronization type are not configured by distinguishing between LTE and NR.

Because the first V2X sidelink and the second V2X sidelink use the same V2X synchronization type and the same SL-V-RNTI, the first V2X sidelink configuration and the second V2X sidelink configuration can be simplified.

In this case, the first-standard V2X sidelink configuration and the second-standard V2X sidelink configuration may include the LTE V2X sidelink transmit resource information, the LTE V2X sidelink receive resource information, the LTE V2X sidelink transmit power, the LTE V2X sidelink MCS, the LTE V2X synchronization configuration, the NR V2X sidelink receive resource information, the NR V2X sidelink transmit resource information, the NR V2X sidelink transmit power, the NR V2X sidelink MCS, the NR V2X synchronization configuration, the common SL-V-RNTI, and the common synchronization type.

A second aspect of this application provides a communications apparatus. The communications apparatus has a function of implementing the first terminal device in the first aspect. For example, the communications apparatus includes modules, units, or means (means) that correspond to the steps performed by the first terminal device in the first aspect. The communications apparatus may also have a function of implementing the network device in the first aspect. For example, the communications apparatus includes modules, units, or means (means) that correspond to the steps performed by the network device in the first aspect. The communications apparatus may also have a function of implementing the second terminal device in the first aspect. For example, the communications apparatus includes modules, units, or means (means) that correspond to the steps performed by the second terminal device in the first aspect. The foregoing functions, modules, units, or means (means) may be implemented by software, may be implemented by hardware, or may be implemented by hardware executing corresponding software.

An apparatus provided in the second aspect of this application may be a terminal device, or may be a chip inside a terminal device. The terminal device or the chip has a function of implementing the communication method according to any one of the foregoing aspects or the possible designs of the foregoing aspects. The function may be implemented by hardware, or may be implemented by hardware executing corresponding software. The hardware or the software includes one or more units corresponding to the foregoing function.

For example, the terminal device may include a processing unit. The processing unit may be a processor. Optionally, the terminal device further includes a transceiver unit. The transceiver unit may be a transceiver. The transceiver includes a radio frequency circuit. Optionally, the terminal device further includes a storage unit. The storage unit may be, for example, a memory. For example, when the terminal device includes the storage unit, the storage unit is configured to store a computer-executable instruction. The processing unit is connected to the storage unit. The processing unit executes the computer-executable instruction stored in the storage unit, so that the terminal device performs the communication method according to any one of the foregoing aspects or the possible designs of the foregoing aspects.

For example, the chip may include a processing unit. The processing unit may be a processor. Optionally, the chip further includes a transceiver unit. The transceiver unit may be an input/output interface, a pin, a circuit, or the like on the chip. The processing unit may execute a computer-executable instruction stored in a storage unit, so that the chip performs the communication method according to any one of the foregoing aspects or the possible designs of the foregoing aspects. Optionally, the chip further includes the storage unit. The storage unit may be a storage unit (for example, a register or a buffer) inside the chip. The storage unit may alternatively be a storage unit (for example, a read-only memory (read-only memory, ROM)) inside the terminal device but outside the chip, another type of static storage device (for example, a random access memory (random access memory, RAM)) capable of storing static information and instructions, or the like.

The processor mentioned above may be a central processing unit (central processing unit, CPU), a microprocessor, or an application specific integrated circuit (application specific integrated circuit, ASIC), or may be one or more integrated circuits for controlling program execution of the communication method according to any one of the foregoing aspects or the possible designs of the foregoing aspects.

In addition, the apparatus may alternatively be a network device, or may be a chip inside a network device. The network device or the chip has a function of implementing the communication method according to any one of the foregoing aspects or the possible designs of the foregoing aspects. The function may be implemented by hardware, or may be implemented by hardware executing corresponding software. The hardware or the software includes one or more units corresponding to the foregoing function.

For example, the network device may include a processing unit. The processing unit may be a processor. The network device may further include a transceiver unit. The transceiver unit may be a transceiver. The transceiver may include a radio frequency circuit. Optionally, the network device further includes a storage unit. The storage unit may be, for example, a memory. For example, when the network device includes the storage unit, the storage unit is configured to store a computer-executable instruction. The processing unit is connected to the storage unit. The processing unit executes the computer-executable instruction stored in the storage unit, so that the network device performs the communication method according to any one of the foregoing aspects or the possible designs of the foregoing aspects.

For example, the chip may include a processing unit. The processing unit may be a processor. The chip may further include a transceiver unit. The transceiver unit may be an input/output interface, a pin, a circuit, or the like on the chip. The processing unit may execute a computer-executable instruction stored in a storage unit, so that the chip performs the communication method according to any one of the foregoing aspects or the possible designs of the foregoing aspects. Optionally, the chip further includes the storage unit. The storage unit may be a storage unit (for example, a register or a buffer) inside the chip. The storage unit may alternatively be a storage unit (for example, a read-only memory (read-only memory, ROM)) inside the network device but outside the chip, another type of static storage device (for example, a random access memory (random access memory, RAM)) capable of storing static information and instructions, or the like.

The processor mentioned above may be a central processing unit (central processing unit, CPU), a microprocessor, or an application specific integrated circuit (application specific integrated circuit, ASIC), or may be one or more integrated circuits for controlling program execution of the communication method according to any one of the foregoing aspects or the possible designs of the foregoing aspects.

For example, the third aspect of the embodiments of this application provides a terminal device, including a memory and a processor. The memory is configured to store a computer program. The computer program is run on the processor, so that the terminal device implements a function of the first terminal device in the first aspect.

For example, a fourth aspect of the embodiments of this application provides a network device, including a memory and a processor. The memory is configured to store a computer program. The computer program is run on the processor, so that the network device implements a function of the network device in the first aspect.

A fifth aspect of the embodiments of this application provides a computer-readable storage medium, configured to store a computer instruction. When the computer instruction is run on a computer, the computer is enabled to perform the communication method according to the first aspect of the embodiments of this application.

A sixth aspect of the embodiments of this application provides a computer program product including an instruction. When the computer program product runs on a computer, the computer is enabled to perform the communication method according to the first aspect of the embodiments of this application.

For example, a seventh aspect of the embodiments of this application provides a chip, including a memory and a processor. The memory is configured to store a computer program. The processor is configured to invoke the computer program from the memory and run the computer program, so that the processor performs the communication method according to the first aspect.

An eighth aspect of the embodiments of this application provides a communications system, including the foregoing network devices and/or terminal devices in various forms.

According to the communication method, the apparatus, and the storage medium provided in this application, the first terminal device receives the first-standard V2X sidelink configuration and the second-standard V2X sidelink configuration from the network device, obtains, based on the first-standard V2X sidelink configuration and the second-standard V2X sidelink configuration, the V2X sidelink resource used for data transmission, and then, communicates with the second terminal device on the V2X sidelink resource. The first terminal device may obtain the first-standard V2X sidelink configuration and the second-standard V2X sidelink configuration from the network device, thereby determining, based on the foregoing two configurations, that the V2X sidelink resource used for data transmission is the first-standard V2X sidelink resource and/or the second-standard V2X sidelink resource, so that the first terminal device performs first-standard V2X service communication and/or second-standard V2X service communication with the second terminal device based on the determined V2X sidelink resource. In this way, it can be ensured that a same terminal device can obtain the first-standard V2X service and the second-standard V2X service.

DESCRIPTION OF EMBODIMENTS

Figure 1:
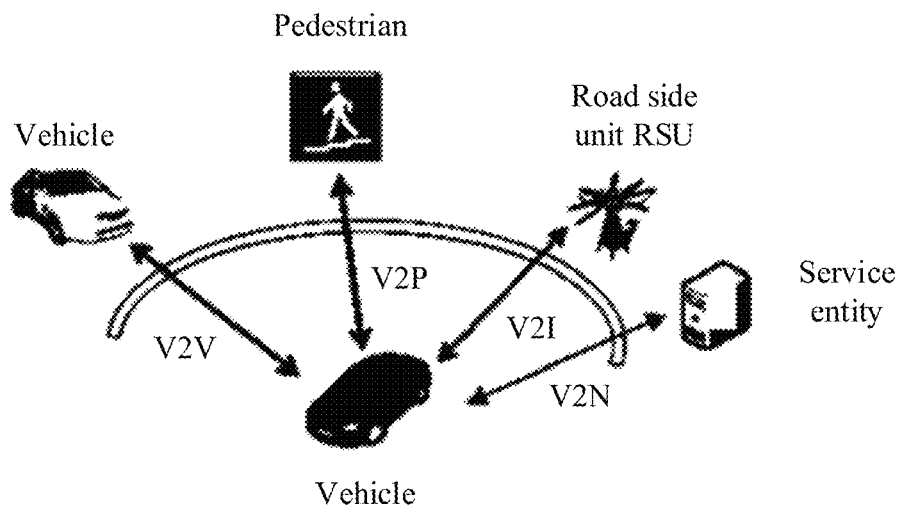
FIG. 1 is a schematic architectural diagram of a V2X service.

A network architecture and a service scenario that are described in embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to similar technical problems.

In the following, some terms in this application are explained and described, to facilitate understanding of the terms for a person skilled in the art.

(1) A terminal device may also be referred to as user equipment (user equipment, UE), an access terminal device, a subscriber unit, a subscriber station, a mobile station, a remote station, a remote terminal device, a mobile device, a user terminal device, a terminal device, a wireless communication device, a user agent, or a user apparatus. The terminal device may be a station (station, ST) in a wireless local area network (wireless local area networks, WLAN), or may be a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device or another processing device connected to a wireless modem, a vehicle-mounted device, a wearable device, and a terminal device in a next-generation communications system, for example, in a fifth-generation (fifth-generation, 5G) communications network, a terminal device in a future evolved public land mobile network (public land mobile network, PLMN), a terminal device in a new radio (new radio, NR) communications system, or the like.

By way of example rather than limitation, in the embodiments of this application, the terminal device may alternatively be a wearable device. The wearable device may also be referred to as a wearable intelligent device, and is a generic name of wearable devices developed by intelligently designing daily wear by using a wearable technology, for example, glasses, gloves, a watch, clothing, and shoes. The wearable device is a portable device that can be directly worn on a body or integrated into clothes or an accessory of a user. The wearable device is not merely a hardware device, but is used to implement a powerful function through software support, a data exchange, and cloud interaction. Generalized wearable intelligent devices include full-featured and large-size devices that can implement complete or partial functions without depending on smartphones, for example, smart watches or smart glasses, and devices that focus only on one type of application function and may work with other devices such as smartphones, for example, various smart bands or smart jewelry for monitoring physical signs.

For example, the terminal device may further include a drone, for example, an airborne communications device on the drone.

(2) A network device may be a device configured to communicate with a mobile device. The network device may be an access point (access point, AP) in the WLAN, a base transceiver station (base transceiver station, BTS) in GSM or CDMA, a NodeB (NodeB, NB) in WCDMA, an evolved Node B (evolved NodeB, eNB or eNodeB) in LTE, a relay station or an access point, a vehicle-mounted device, a wearable device, a network device in the future 5G network, a network device in the future evolved PLMN network, a new generation NodeB (new generation NodeB, gNodeB) in the NR system, or the like.

(3) V2X is a type of a communication service for which a V2V application is used, is transmitted through the 3GPP system, and includes a V2I service, a V2N service, a V2P service, and a V2V service. Participants of the V2I service include a terminal device and a roadway infrastructure. Participants of the V2N service include a terminal device and a service entity, and communicate with each other by using a network device. Two participants in either of the V2P service and the V2V service are both terminal devices.

(4) A unit in this application is a functional unit or a logical unit. The unit may be in a form of software, and implements a function of the unit by a processor executing program code. Alternatively, the unit may be in a form of hardware.

(5) "A plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. A range described by using "above", "below", or the like includes a boundary point.

A person skilled in the art may understand that a communication method provided in the embodiments of this application may be applied to V2X services in a 5th generation (5th generation, 5G) network and LTE. FIG. 1 is a schematic architectural diagram of a V2X service. As shown in FIG. 1, the V2X service includes a V2I service, a V2N service, a V2P service, and a V2V service. The V2X service may be transmitted through a PC5 interface or a Uu interface.

Optionally, a first-standard V2X service in the embodiments of this application is an LTE V2X service, or is an NR V2X service. Correspondingly, a second-standard V2X service may be an NR V2X service, or may be an LTE V2X service. Optionally, first-standard V2X and second-standard V2X are alternatively wireless fidelity (wireless fidelity, Wi-Fi). Different standards may alternatively be access technologies for which different spectrum resources, different encoding and decoding technologies, different subcarrier spacings, different transmission timings (transmission timing), different CP lengths, different modulation and demodulation technologies, or different transmission time intervals are used.

In the embodiments of this application, an example in which the first-standard V2X service is an LTE V2X service and the second-standard V2X service is an NR V2X service is used for description. When the first-standard V2X service and the second-standard V2X service are other V2X technologies that support the V2X service, a specific communication manner may be similar to that used when the first-standard V2X service is the LTE V2X service and the second-standard V2X service is the NR V2X service. Details are not described herein again.

Figure 2A:
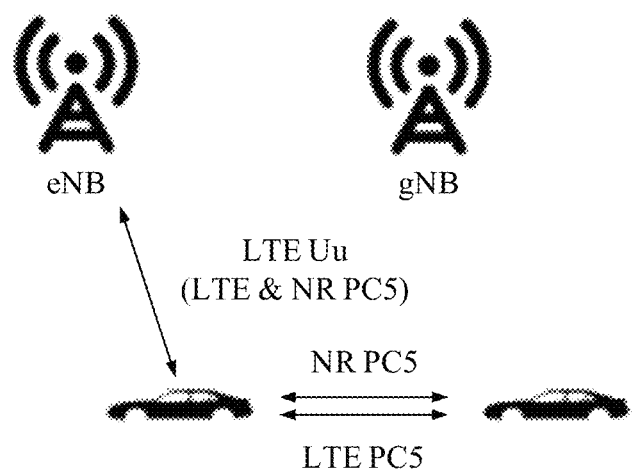
FIG. 2a and FIG. 2b are respectively a schematic diagram of data transmission of a V2X service in an LTE system and a schematic diagram of data transmission of a V2X service in an NR system.
Figure 2B:
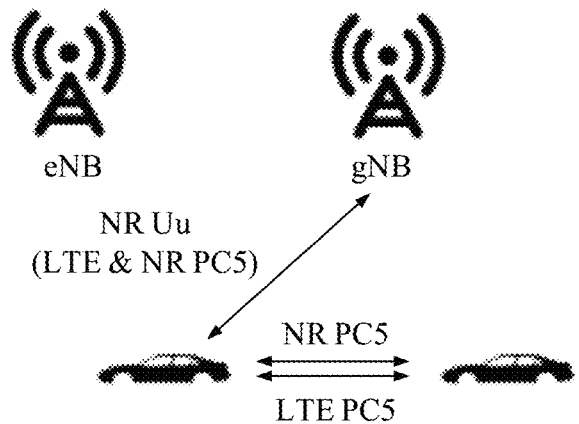

FIG. 2a and FIG. 2b are respectively a schematic diagram of data transmission of a V2X service in an LTE system and a schematic diagram of data transmission of a V2X service in an NR system. FIG. 2a shows a case in which an LTE V2X sidelink (sidelink) resource and an NR V2X sidelink resource are managed by using an eNodeB (eNB) in LTE. For the V2X service, data may be transmitted between the eNB and a first terminal device through a Uu interface, and then the V2X service is transmitted to a second terminal device by using a network side; or data may be directly transmitted through an LTE PC5 interface and/or an NR PC5 interface between a first terminal device and a second terminal device.

FIG. 2b shows a case in which an LTE V2X sidelink (sidelink) resource and an NR V2X sidelink resource are managed by using a gNB (gNB) in NR. For the V2X service, data may be transmitted between the gNB and a first terminal device through a Uu interface, and then the V2X service is transmitted to a second terminal device by using a network side; or data may be directly transmitted through an LTE PC5 interface and/or an NR PC5 interface between a first terminal device and a second terminal device.

The V2X service may be, for example, an IP, a non-IP, V2V, V2I, V2N, V2P, a provider service identifier (provider service identifier, PSID), or an intelligent transport systems application identifier (intelligent transport systems application identifier, ITS-AID).

Based on the system architectures shown in FIG. 1, FIG. 2a, and FIG. 2b, the embodiments of this application provide the communication method. The first terminal device receives a first-standard V2X sidelink configuration and a second-standard V2X sidelink configuration from a network device, obtains, based on the first-standard V2X sidelink configuration and the second-standard V2X sidelink configuration, a V2X sidelink resource used for data transmission, and then communicates with the second terminal device on the V2X sidelink resource. The first terminal device may obtain the first-standard V2X sidelink configuration and the second-standard V2X sidelink configuration from the network device, thereby determining, based on the foregoing two configurations, that the V2X sidelink resource used for data transmission is the first-standard V2X sidelink resource and/or the second-standard V2X sidelink resource, so that the first terminal device performs V2X service communication with the second terminal device based on the determined V2X sidelink resource. In this way, it can be ensured that a same terminal device can obtain a first-standard V2X service and a second-standard V2X service.

Figure 3:
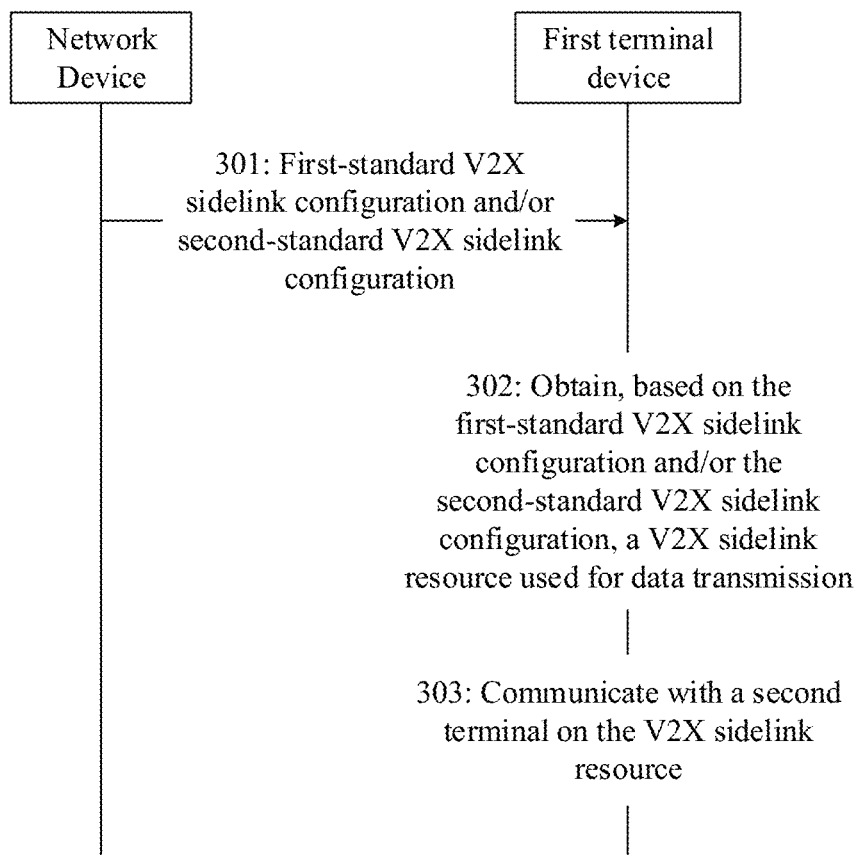
FIG. 3 is a signaling flowchart of a communication method according to this application.

FIG. 3 is a signaling flowchart of a communication method according to this application. Based on the system architectures shown in FIG. 1, FIG. 2a, and FIG. 2b, as shown in FIG. 3, the method in this embodiment may include the following steps.

Step 301: A network device sends a first-standard V2X sidelink configuration and/or a second-standard V2X sidelink configuration to the first terminal device.

In this embodiment, the network device may be a base station corresponding to a first standard, or may be a base station corresponding to a second standard. To be specific, a base station in a standard uniformly manages a first-standard V2X sidelink (sidelink) and a second-standard V2X sidelink (sidelink).

The network device may send the first-standard V2X sidelink (sidelink) configuration and/or the second-standard V2X sidelink (sidelink) configuration to the first terminal device in a broadcast manner or by using dedicated signaling. When the network device sends the first-standard V2X sidelink (sidelink) configuration and/or the second-standard V2X sidelink (sidelink) configuration to the first terminal device by using the dedicated signaling, the network device usually first generates the first-standard V2X sidelink (sidelink) configuration and/or the second-standard V2X sidelink (sidelink) configuration locally, and then, sends the two configurations by using higher layer signaling.

For example, in a possible implementation, when the network device sends the first-standard V2X sidelink configuration and/or the second-standard V2X sidelink configuration, the network device first obtains at least one of information indicating that the first terminal device supports a first-standard V2X service, information indicating that the first terminal device supports a second-standard V2X service, grant information of the first terminal device, and sidelink (sidelink) aggregate maximum bit rates (aggregate maximum bit rate, AMBR) of the first terminal device. For example, the network device obtains any one of the information indicating that the first terminal device supports the first-standard V2X service, the information indicating that the first terminal device supports the second-standard V2X service, the grant information of the first terminal device, and the sidelink (sidelink) AMBRs of the first terminal device, may obtain any two of the information indicating that the first terminal device supports the first-standard V2X service, the information indicating that the first terminal device supports the second-standard V2X service, the grant information of the first terminal device, and the sidelink (sidelink) AMBRs of the first terminal device, or may obtain any three of the information indicating that the first terminal device supports the first-standard V2X service, the information indicating that the first terminal device supports the second-standard V2X service, the grant information of the first terminal device, and the sidelink (sidelink) AMBRs of the first terminal device. For example, the network device may alternatively obtain all of the information indicating that the first terminal device supports the first-standard V2X service, the information indicating that the first terminal device supports the second-standard V2X service, the grant information of the first terminal device, and the sidelink (sidelink) AMBRs of the first terminal device.

Then, the network device may send the first-standard V2X sidelink configuration and/or the second-standard V2X sidelink configuration to the first terminal device based on the at least one of the information indicating that the first terminal device supports the first-standard V2X service, the information indicating that the first terminal device supports the second-standard V2X service, the grant information of the first terminal device, and the sidelink (sidelink) AMBRs of the first terminal device.

The sidelink (sidelink) AMBRs may include a first-standard V2X sidelink (sidelink) AMBR and a second-standard V2X sidelink (sidelink) AMBR. For example, the grant information may include at least one of the following information: whether the first terminal device is granted as a first-standard vehicle (Vehicle) terminal device, whether the first terminal device is granted as a first-standard pedestrian (Pedestrian) terminal device, whether the first terminal device is granted as a second-standard vehicle (Vehicle) terminal device, and whether the first terminal device is granted as a second-standard pedestrian (Pedestrian) terminal device. The first terminal device first obtains the information indicating that the first terminal device supports the first-standard V2X service and the information indicating that the first terminal device supports the second-standard V2X service that may be specifically capability indication information indicating that the first terminal device supports the first-standard V2X service and capability indication information indicating that the first terminal device supports the second-standard V2X service.

Optionally, the network device also broadcasts, to the first terminal device, a V2X supporting status of the network device. The V2X service supporting status of the network device may include any one, any two, or all of the following: The network device supports only the first-standard V2X service; the network device supports only the second-standard V2X service; or the network device supports both the first-standard V2X service and the second-standard V2X service. In this case, the first terminal device may select a base station that matches a capability of the first terminal device, to camp on or access the base station. For example, if the first terminal device supports both the first-standard V2X service and the second-standard V2X service, the first terminal device may select, under an equal condition, a network device that supports both the first-standard V2X service and the second-standard V2X service, to access the network device. After the access, the first terminal device sends, to the network device, the information indicating that the first terminal device supports the first-standard V2X service and the information indicating that the first terminal device supports the second-standard V2X service.

Optionally, when the first terminal device performs registration authentication on a core network device, the core network device sends the grant information of the first terminal device to the network device, the core network device sends the sidelink (sidelink) AMBRs to the network device, or the core network device sends the grant information of the first terminal device and the sidelink (sidelink) AMBRs of the first terminal device to the network device.

Further, the network device may alternatively obtain the information indicating that the first terminal device supports the first-standard V2X service, the information indicating that the first terminal device supports the second-standard V2X service, the grant information of the first terminal device, and the sidelink (sidelink) AMBRs of the first terminal device from a source base station or the core network device in a handover scenario. Optionally, in a dual connectivity DC scenario, the network device alternatively obtains the foregoing information from a primary base station.

Further, after the network device determines, based on the information indicating that the first terminal device supports the first-standard V2X service and the information indicating that the first terminal device supports the second-standard V2X service, that the first terminal device supports the first-standard V2X service and the second-standard V2X service, and determines that the first terminal device is granted, the network device may configure the first-standard V2X sidelink configuration and/or the second-standard V2X sidelink configuration for the first terminal device.

For example, the first standard is LTE, and the second standard is NR. The first-standard V2X sidelink configuration includes at least one of the following information: LTE V2X sidelink transmit resource information, LTE V2X sidelink receive resource information, an LTE V2X sidelink transmit power, an LTE V2X sidelink modulation and coding scheme (modulation and coding scheme, MCS), an LTE sidelink vehicle-to-everything radio network temporary identifier (sidelink-V2X-radio network temporary identifier, SL-V-RNTI), an LTE V2X synchronization type, and an LTE V2X synchronization configuration. The second-standard V2X sidelink configuration includes at least one of the following information: NR V2X sidelink receive resource information, NR V2X sidelink transmit resource information, an NR V2X sidelink transmit power, an NR V2X sidelink MCS, an NR SL-V-RNTI, an NR V2X synchronization type, and an NR V2X synchronization configuration.

Optionally, the first V2X sidelink and the second V2X sidelink use a same V2X synchronization type and a same SL-V-RNTI.

For example, because both an LTE V2X sidelink and an NR V2X sidelink are managed by the network device, a portion of configurations of the LTE V2X sidelink may be the same as those of the NR V2X sidelink. For example, an SL-V-RNTI and a V2X synchronization type may be common configurations. To be specific, the SL-V-RNTI and the V2X synchronization type are not configured by distinguishing between LTE and NR.

Because the first V2X sidelink and the second V2X sidelink use the same V2X synchronization type and the same SL-V-RNTI, the first V2X sidelink configuration and the second V2X sidelink configuration can be simplified.

In this case, the first-standard V2X sidelink configuration and the second-standard V2X sidelink configuration may include the LTE V2X sidelink transmit resource information, the LTE V2X sidelink receive resource information, the LTE V2X sidelink transmit power, the LTE V2X sidelink MCS, the LTE V2X synchronization configuration, the NR V2X sidelink receive resource information, the NR V2X sidelink transmit resource information, the NR V2X sidelink transmit power, the NR V2X sidelink MCS, the NR V2X synchronization configuration, the common SL-V-RNTI, and the common synchronization type.

Step 302: The first terminal device obtains, based on the first-standard V2X sidelink configuration and/or the second-standard V2X sidelink configuration, a V2X sidelink resource used for data transmission.

In this embodiment, after the first terminal device receives the first-standard V2X sidelink configuration and/or the second-standard V2X sidelink configuration that are/is sent by the network device, the first terminal device may select, from available first-standard V2X sidelink resources included in the first-standard V2X sidelink configuration and available second-standard V2X sidelink resources included in the second-standard V2X sidelink configuration, a first-standard V2X sidelink resource to transmit data, a second-standard V2X sidelink resource to transmit data, or a first-standard V2X sidelink resource and a second-standard V2X sidelink resource to transmit data. Alternatively, the first terminal device may request a first-standard V2X sidelink resource and/or a second-standard V2X sidelink resource from the network device based on the first-standard V2X sidelink configuration and the second-standard V2X sidelink configuration, to transmit data.

That is, a manner in which the first terminal device obtains the V2X sidelink resource used for data transmission may be that the first terminal device determines the V2X sidelink resource, or may be that the first terminal device receives the V2X sidelink resource allocated by the network device.

The following describes, by using an example, the manner in which the first terminal device obtains the V2X sidelink resource used for data transmission.

In a possible implementation, that the first terminal device obtains the V2X sidelink resource used for data transmission includes: receiving, by the first terminal device, a first message broadcast by the network device, where the first message may include any one, any two, or all of an identifier of an area, a first-standard V2X sidelink configuration corresponding to the area, and a second-standard V2X sidelink configuration corresponding to the area, the first-standard V2X sidelink configuration includes available first-standard V2X sidelink resources, and the second-standard V2X sidelink configuration includes available second-standard V2X sidelink resources; and selecting, by the first terminal device based on an area in which the first terminal device is currently located, at least one of available first-standard V2X sidelink resources corresponding to the area and/or at least one of available second-standard V2X sidelink resources corresponding to the area.

For example, the first message may include only any one of the identifier of the area, the first-standard V2X sidelink configuration corresponding to the area, and the second-standard V2X sidelink configuration corresponding to the area. Alternatively, the first message may include any two of the identifier of the area, the first-standard V2X sidelink configuration corresponding to the area, and the second-standard V2X sidelink configuration corresponding to the area. For example, the first message includes the identifier of the area and the first-standard V2X sidelink configuration corresponding to the area. Alternatively, the first message includes the identifier of the area and the second-standard V2X sidelink configuration corresponding to the area. Alternatively, the first message includes the first-standard V2X sidelink configuration corresponding to the area and the second-standard V2X sidelink configuration corresponding to the area. Alternatively, the first message may include all of the identifier of the area, the first-standard V2X sidelink configuration corresponding to the area, and the second-standard V2X sidelink configuration corresponding to the area.

For example, the V2X service may be transmitted through the PC5 interface, and a communication mode through the PC5 interface may be further classified into two modes: a mode 3 mode and a mode 4 mode. In the mode 3 mode, each time a terminal device sends data, the terminal device needs to request a resource from the network device. In the mode 4 mode, the terminal device continues to send data by contending for a resource from common resources allocated by the network device. The common resources may be related to a location, or may be allocated by the network device to the terminal device by using dedicated signaling and not be related to a location.

Optionally, to support the mode 4 mode, the network device broadcasts the first message in a cell. The first message includes the identifier of the one or more areas, the first-standard V2X sidelink configuration corresponding to the area, and the second-standard V2X sidelink configuration corresponding to the area. The first-standard V2X sidelink configuration includes the available first-standard V2X sidelink resources, and the second-standard V2X sidelink configuration includes the available second-standard V2X sidelink resources. When determining the area in which the first terminal device is located, the first terminal device may select a resource from available resources corresponding to the area, to transmit data. For example, the first terminal device may select the at least one of the available first-standard V2X sidelink resources as the V2X sidelink resource, to transmit data; may select the at least one of the available second-standard V2X sidelink resources as the V2X sidelink resource, to transmit data; or may select the at least one of the available first-standard V2X sidelink resources and the at least one of the available second-standard V2X sidelink resources as the V2X sidelink resources, to transmit data. Optionally, when the first terminal device selects both the first-standard V2X sidelink resource and the second-standard V2X sidelink resource to transmit data, the first terminal device performs a duplication (duplication) operation. To be specific, the first terminal device sends same data or signaling on the first-standard V2X sidelink resource and the second-standard V2X sidelink resource.

For example, the network device broadcasts a plurality of available resources for the area, and the first terminal device selects one or more available resources from the plurality of available resources broadcast by the network device. For example, when performing carrier aggregation (carrier aggregation, CA), the first terminal device may select two or more available resources.

In the foregoing solution, when broadcasting a message to the first terminal device, the network device can provide the V2X sidelink configurations in the two standards for the first terminal device. In this way, the first terminal device can obtain the V2X sidelink configurations in the two standards when the first terminal device is in an idle state, so that the first terminal device can also obtain the first-standard V2X service and the second-standard V2X service when the first terminal device is in an idle state.

Optionally, the first message broadcast by the network device to the first terminal device includes both the V2X sidelink configurations in the two different standards, the indication information used to indicate that the first-standard V2X service is supported, and the indication information used to indicate that the second-standard V2X service is supported. Optionally, the first message includes only the first-standard V2X sidelink configuration and the second-standard V2X sidelink configuration. In this case, after the first terminal device receives the foregoing configurations, the first terminal device may determine, based on the foregoing configurations, that the network supports the first-standard V2X service and the second-standard V2X service. For example, if the first message includes first-standard V2X sidelink transmit resource information and second-standard V2X sidelink transmit resource information, the first terminal device may determine that the network device can support both the first-standard V2X service and the second-standard V2X service. In addition, the network device provides the available first-standard V2X sidelink sidelink resources and the available second-standard V2X sidelink sidelink resources. Optionally, the network device alternatively broadcasts only one type of V2X sidelink configuration, or one type of V2X sidelink configuration and indication information indicating that one type of V2X service is supported. The V2X service may be the first-standard V2X service, or may be the second-standard V2X service.

Optionally, in consideration of an access network (Radio Access Network, RAN) sharing scenario, information broadcast by the network device corresponds to a public land mobile network (public land mobile network, PLMN) in this case. For example, when the first terminal device supports a plurality of PLMNs, a plurality of sets of information broadcast by the foregoing network device may correspond to the plurality of PLMNs.

Further, when obtaining the V2X sidelink resource, the first terminal device may first obtain information indicating that the second terminal device supports the first-standard V2X service and information indicating that the second terminal device supports the second-standard V2X service, and then, select the V2X sidelink resource based on the information indicating that the second terminal device supports the first-standard V2X service and the information indicating that the second terminal device supports the second-standard V2X service.

For example, before selecting the V2X sidelink resource, the first terminal device first learns of whether the second terminal device can support the first-standard V2X service, whether the second terminal device can support the second-standard V2X service, or whether the second terminal device can support both the first-standard V2X service and the second-standard V2X service. In an implementation process, the first terminal device may obtain, by using a V2X control function (control function), from the network device, or by using an application (application, APP) installed in the first terminal device, whether the second terminal device can support the first-standard V2X service, whether the second terminal device can support the second-standard V2X service, or whether the second terminal device can support both the first-standard V2X service and the second-standard V2X service.

For example, the first terminal device may obtain, from the network device, the information indicating that the second terminal device supports the first-standard V2X service and the information indicating that the second terminal device supports the second-standard V2X service. An implementation includes: sending, by the first terminal device, an identifier of the second terminal device to the network device; obtaining, by the network device based on the identifier of the second terminal device, the information indicating that the second terminal device supports the first-standard V2X service and the information indicating that the second terminal device supports the second-standard V2X service; and sending the information indicating that the second terminal device supports the first-standard V2X service and the information indicating that the second terminal device supports the second-standard V2X service to the first terminal device.

When learning of that the second terminal device can support both the first-standard V2X service and the second-standard V2X service, the first terminal device selects the V2X sidelink resource in the foregoing manner.

Optionally, if the first terminal device learns of that the second terminal device can support only the first-standard V2X service, correspondingly, the first terminal device selects the first-standard V2X sidelink resource. Alternatively, if the first terminal device learns of that the second terminal device can support only the second-standard V2X service, correspondingly, the first terminal device may select the second-standard V2X sidelink resource.

In another possible implementation, that the first terminal device obtains the V2X sidelink resource used for data transmission includes: sending, by the first terminal device, a second message to the network device, where the second message carries at least one piece of information used to indicate a network standard; and receiving, by the first terminal device, a V2X sidelink resource sent by the network device based on the network standard.

For example, to support a mode 3 mode, the first terminal device needs to request a resource from the network device each time before sending data. The first terminal device sends the second message to the network device. The second message includes information used to indicate a sidelink radio access technology (radio access technology, RAT) type (type), for example, used to indicate whether the sidelink radio access technology type is the first standard or the second standard, or used to indicate both the first standard and the second standard.

After receiving the second message sent by the first terminal device, the network device determines the V2X sidelink resource based on the information that is used to indicate the network standard and that is carried in the second message, and sends the V2X sidelink resource to the first terminal device. For example, if the second message carries information used to indicate the first standard, the network device determines that the V2X sidelink resource is the first-standard V2X sidelink resource. If the second message carries information used to indicate the second standard, the network device determines that the V2X sidelink resource is the second-standard V2X sidelink resource. If the second message carries information used to indicate the first standard and the second standard, the network device determines that the V2X sidelink resources are the first-standard V2X sidelink resource and the second-standard V2X sidelink resource.

For example, the second message may be a scheduling report (scheduling report, SR) or a buffer status report (buffer status report, BSR). When reporting the SR or the BSR, the first terminal device may use the SR or the BSR to carry the at least one piece of information used to indicate the network standard. For a semi-persistent scheduling (semi-persistent scheduling, SPS) configuration, the second message may be terminal device assistance information (UE Assistance Information). When sending the UE assistance information message to the network device, the first terminal device uses the UE assistance information message to carry a service mode and the at least one piece of information used to indicate the network standard. The semi-persistent configuration may also be referred to as a configured grant (configured grant) configuration, and may be of a type 1 or a type 2. The terminal device assistance information message is used to request a network side to allocate a configured grant resource.

The first terminal device can send, to the network device, the information used to indicate the network standard. In this way, the network device sends the V2X sidelink resource to the first terminal device based on the network standard. Therefore, the first terminal device obtains the corresponding V2X sidelink resource according to an actual requirement.

Further, the network device may allocate the V2X sidelink resource to the first terminal device with reference to information indicating that the second terminal device supports the first-standard V2X service and information indicating that the second terminal device supports the second-standard V2X service. For example, the network device receives a device identifier, sent by the first terminal device, of the second terminal device. The network device obtains, based on the device identifier, the information indicating that the second terminal device supports the first-standard V2X service and the information indicating that the second terminal device supports the second-standard V2X service, and determines the V2X sidelink resource based on the information indicating that the second terminal device supports the first-standard V2X service and the information indicating that the second terminal device supports the second-standard V2X service, so that the determined V2X sidelink resource is more proper.

In still another possible implementation, that the first terminal device obtains the V2X sidelink resource used for data transmission includes: receiving, by the first terminal device, a configuration rule sent by the network device, where the configuration rule includes any one, any two, any three, or all of the following information: a mapping relationship between a V2X service type and a resource, a mapping relationship between a quality of service QoS (quality of service, QoS) parameter and a resource, a quality of service QoS parameter threshold, and a sidelink quality threshold, and the sidelink quality threshold includes a first-standard V2X sidelink quality threshold and/or a second-standard V2X sidelink quality threshold; and determining, by the first terminal device, the V2X sidelink resource according to the configuration rule.

For example, the network device may deliver the configuration rule to the first terminal device. In this way, the first terminal device may obtain, according to the configuration rule, the V2X sidelink resource used for data transmission. The configuration rule may include the any one, any two, any three, or all of the foregoing information. For example, the configuration rule may include the mapping relationship between a V2X service type and a resource and the sidelink quality threshold. In this case, the first terminal device measures an LTE/NR V2X sidelink CBR. When the LTE/NR V2X SL CBR satisfies a threshold, the first terminal device executes a mapping relationship, configured by the network device, between a service type or a QoS parameter and a resource.

For example, the resource may be the first-standard V2X sidelink resource, may be the second-standard V2X sidelink resource, or may be the first-standard V2X sidelink resource and the second-standard V2X sidelink resource.

For example, the quality of service QoS parameter may include any one, any two, or all of the following information: a prose per-packet priority (prose per packet priority, PPPP), prose per-packet reliability (prose per packet reliability, PPPR), and quality of service flow indicator (QoS flow indicator, QFI). The quality of service flow indicator may alternatively be a 5QI (5G QoS Identifier) or a priority level (priority level).

For example, a sidelink quality parameter may include a channel busy ratio (Channel Busy Ratio, CBR).

When the configuration rule includes the mapping relationship between a V2X service type and a resource, the first terminal device obtains, based on a type of a V2X service that needs to be transmitted, a V2X sidelink resource corresponding to the type of the V2X service that needs to be transmitted. For example, different V2X service types are served by V2X sidelink resources in different standards. For example, a first V2X service corresponds to the first-standard V2X sidelink resource, and a second V2X service corresponds to the second-standard V2X sidelink resource. When the first terminal device needs to transmit the first V2X service, the first terminal device obtains the first-standard V2X sidelink resource. When the first terminal device needs to transmit the second V2X service, the first terminal device obtains the second-standard V2X sidelink resource. When the first terminal device needs to transmit both the first V2X service and the second V2X service, the first terminal device obtains the first-standard V2X sidelink resource and the second-standard V2X sidelink resource.

After receiving the configuration rule sent by the network device, the first terminal device may determine the V2X sidelink resource according to the configuration rule. In this way, the first terminal device can obtain the first-standard V2X service and the second-standard V2X service based on the obtained V2X sidelink resource.

Optionally, when the configuration rule includes the mapping relationship between a quality of service QoS parameter and a resource, for example, the network device configures the mapping relationship between a QoS parameter and a resource for the first terminal device. The QoS parameter includes at least one of a prose per-packet priority (prose per packet priority, PPPP), prose per-packet reliability (prose per packet reliability, PPPR), and quality of service flow indicator (QoS flow indicator, QFI). The resource includes the first V2X sidelink resource and the second V2X sidelink resource. The network device configures the correspondence between a QoS parameter and a resource for the first terminal device. Optionally, the network device further configures a correspondence between a QoS parameter, a resource, and a logical channel group (logical channel group, LCG) for the first terminal device. After the first terminal device receives the foregoing configurations, when V2X service data arrives, the first terminal device obtains a QoS parameter of the V2X service data, and maps the corresponding data to a corresponding LCG according to the configuration rule configured by the network device. When the BSR is reported, only LCG information is carried. In this case, the network device can learn of, based on the configuration rule sent to the first terminal device, a resource that needs to be allocated to data of the LCG, namely, the first-standard V2X sidelink resource and/or the second-standard V2X sidelink resource. The first terminal device receives the first-standard V2X sidelink resource and/or the second-standard V2X sidelink resource that are/is allocated by the network device, and uses, based on a correspondence between a resource and a logical channel group, the first-standard V2X sidelink resource and/or the second-standard V2X sidelink resource to send the V2X service data buffered on the corresponding LCG.

Optionally, when the configuration rule includes the quality of service QoS parameter threshold, and the quality of service QoS parameter threshold includes a first prose per-packet priority (prose per packet priority, PPPP) threshold and/or a first prose per-packet reliability (prose per packet reliability, PPPR) threshold, a manner in which the first terminal device determines the V2X sidelink resource according to the configuration rule satisfies any one of the following:

If a PPPP of a to-be-sent data packet of the first terminal device is greater than or greater than or equal to the first PPPP threshold, and/or PPPR of the to-be-sent data packet is greater than or greater than or equal to the first PPPR threshold, it is determined that the V2X sidelink resource is the first-standard V2X sidelink resource.

For example, the to-be-sent data packet of the first terminal device has the corresponding PPPP and/or PPPR. If the PPPP of the to-be-sent data packet is greater than or greater than or equal to the first PPPP threshold, it is determined that the V2X sidelink resource is the first-standard V2X sidelink resource. Alternatively, if the PPPR of the to-be-sent data packet is greater than or greater than or equal to the first PPPR threshold, it is determined that the V2X sidelink resource is the first-standard V2X sidelink resource. Alternatively, if the PPPP of the to-be-sent data packet is greater than or greater than or equal to the first PPPP threshold, and the PPPR of the to-be-sent data packet is greater than or greater than or equal to the first PPPR threshold, it is determined that the V2X sidelink resource is the first-standard V2X sidelink resource.

According to an existing standard, a smaller PPPP value indicates a higher priority of the to-be-sent data packet. Assuming that a smaller PPPR value indicates a higher reliability requirement of the to-be-sent data, and it is considered that the first-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is greater than or greater than or equal to the first PPPR threshold, it is determined that the V2X sidelink resource is the first-standard V2X sidelink resource. In this way, the terminal device can select a proper V2X resource to satisfy a QoS requirement of the data packet.

If a PPPP of a to-be-sent data packet of the first terminal device is greater than or greater than or equal to the first PPPP threshold, and/or PPPR of the to-be-sent data packet is greater than or greater than or equal to the first PPPR threshold, it is determined that the V2X sidelink resource is the second-standard V2X sidelink resource.

For example, the to-be-sent data packet of the first terminal device has the corresponding PPPP and/or PPPR. If the PPPP of the to-be-sent data packet is greater than or greater than or equal to the first PPPP threshold, it is determined that the V2X sidelink resource is the second-standard V2X sidelink resource. Alternatively, if the PPPR of the to-be-sent data packet is greater than or greater than or equal to the first PPPR threshold, it is determined that the V2X sidelink resource is the second-standard V2X sidelink resource. Alternatively, if the PPPP of the to-be-sent data packet is greater than or greater than or equal to the first PPPP threshold, and the PPPR of the to-be-sent data packet is greater than or greater than or equal to the first PPPR threshold, it is determined that the V2X sidelink resource is the second-standard V2X sidelink resource.

According to an existing standard, a smaller PPPP value indicates a higher priority of the to-be-sent data packet. Assuming that a smaller PPPR value indicates a higher reliability requirement of the to-be-sent data, and it is considered that the second-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is greater than or greater than or equal to the first PPPR threshold, it is determined that the V2X sidelink resource is the second-standard V2X sidelink resource. In this way, the terminal device can select a proper V2X resource to satisfy a QoS requirement of the data packet.

If a PPPP of a to-be-sent data packet of the first terminal device is greater than or greater than or equal to the first PPPP threshold, and/or PPPR of the to-be-sent data packet is less than or less than or equal to the first PPPR threshold, it is determined that the V2X sidelink resource is the first-standard V2X sidelink resource.

For example, the to-be-sent data packet of the first terminal device has the corresponding PPPP and/or PPPR. If the PPPP of the to-be-sent data packet is greater than or greater than or equal to the first PPPP threshold, it is determined that the V2X sidelink resource is the first-standard V2X sidelink resource. Alternatively, if the PPPR of the to-be-sent data packet is less than or less than or equal to the first PPPR threshold, it is determined that the V2X sidelink resource is the first-standard V2X sidelink resource.

Alternatively, if the PPPP of the to-be-sent data packet is greater than or greater than or equal to the first PPPP threshold, and the PPPR of the to-be-sent data packet is less than or less than or equal to the first PPPR threshold, it is determined that the V2X sidelink resource is the first-standard V2X sidelink resource.

According to an existing standard, a smaller PPPP value indicates a higher priority of the to-be-sent data packet. Assuming that the larger PPPR value indicates a higher reliability requirement of the to-be-sent data, and it is considered that the first-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is less than or less than or equal to the first PPPR threshold, it is determined that the V2X sidelink resource is the first-standard V2X sidelink resource. In this way, the terminal device can select a proper V2X resource to satisfy a QoS requirement of the data packet.

If a PPPP of a to-be-sent data packet of the first terminal device is greater than or greater than or equal to the first PPPP threshold, and/or PPPR of the to-be-sent data packet is less than or less than or equal to the first PPPR threshold, it is determined that the V2X sidelink resource is the second-standard V2X sidelink resource.

For example, the to-be-sent data packet of the first terminal device has the corresponding PPPP and/or PPPR. If the PPPP of the to-be-sent data packet is greater than or greater than or equal to the first PPPP threshold, it is determined that the V2X sidelink resource is the second-standard V2X sidelink resource. Alternatively, if the PPPR of the to-be-sent data packet is less than or less than or equal to the first PPPR threshold, it is determined that the V2X sidelink resource is the second-standard V2X sidelink resource. Alternatively, if the PPPP of the to-be-sent data packet is greater than or greater than or equal to the first PPPP threshold, and the PPPR of the to-be-sent data packet is less than or less than or equal to the first PPPR threshold, it is determined that the V2X sidelink resource is the second-standard V2X sidelink resource.

According to an existing standard, a smaller PPPP value indicates a higher priority of the to-be-sent data packet. Assuming that a larger PPPR value indicates a higher reliability requirement of the to-be-sent data, and it is considered that the second-standard V2X sidelink resource may be used for transmission of data having a lower priority and/or a lower reliability requirement, when the PPPP of the to-be-sent data packet is greater than or greater than or equal to the first PPPP threshold, and/or when the PPPR of the to-be-sent data packet is less than or less than or equal to the first PPPR threshold, it is determined that the V2X sidelink resource is the second-standard V2X sidelink resource. In this way, the terminal device can select a proper V2X resource to satisfy a QoS requirement of the data packet.

If a PPPP of a to-be-sent data packet of the first terminal device is less than or less than or equal to the first PPPP threshold, and/or PPPR of the to-be-sent data packet is less than or less than or equal to the first PPPR threshold, it is determined that the V2X sidelink resource is the first-standard V2X sidelink resource.

For example, the to-be-sent data packet of the first terminal device has the corresponding PPPP and/or PPPR. If the PPPP of the to-be-sent data packet is less than or less than or equal to the first PPPP threshold, it is determined that the V2X sidelink resource is the first-standard V2X sidelink resource. Alternatively, if the PPPR of the to-be-sent data packet is less than or less than or equal to the first PPPR threshold, it is determined that the V2X sidelink resource is the first-standard V2X sidelink resource. Alternatively, if the PPPP of the to-be-sent data packet is less than or less than or equal to the first PPPP threshold, and the PPPR of the to-be-sent data packet is less than or less than or equal to the first PPPR threshold, it is determined that the V2X sidelink resource is the first-standard V2X sidelink resource.

According to an existing standard, a smaller PPPP value indicates a higher priority of the to-be-sent data packet. Assuming that a smaller PPPR value indicates a higher reliability requirement of the to-be-sent data, and it is considered that the first-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is less than or less than or equal to the first PPPR threshold, it is determined that the V2X sidelink resource is the first-standard V2X sidelink resource. In this way, the terminal device can select a proper V2X resource to satisfy a QoS requirement of the data packet.

If a PPPP of a to-be-sent data packet of the first terminal device is less than or less than or equal to the first PPPP threshold, and/or PPPR of the to-be-sent data packet is less than or less than or equal to the first PPPR threshold, it is determined that the V2X sidelink resource is the second-standard V2X sidelink resource.

For example, the to-be-sent data packet of the first terminal device has the corresponding PPPP and/or PPPR. If the PPPP of the to-be-sent data packet is less than or less than or equal to the first PPPP threshold, it is determined that the V2X sidelink resource is the second-standard V2X sidelink resource. Alternatively, if the PPPR of the to-be-sent data packet is less than or less than or equal to the first PPPR threshold, it is determined that the V2X sidelink resource is the second-standard V2X sidelink resource. Alternatively, if the PPPP of the to-be-sent data packet is less than or less than or equal to the first PPPP threshold, and the PPPR of the to-be-sent data packet is less than or less than or equal to the first PPPR threshold, it is determined that the V2X sidelink resource is the second-standard V2X sidelink resource.

According to an existing standard, a smaller PPPP value indicates a higher priority of the to-be-sent data packet. Assuming that a smaller PPPR value indicates a higher reliability requirement of the to-be-sent data, and it is considered that the second-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is less than or less than or equal to the first PPPR threshold, it is determined that the V2X sidelink resource is the second-standard V2X sidelink resource. In this way, the terminal device can select a proper V2X resource to satisfy a QoS requirement of the data packet.

If a PPPP of a to-be-sent data packet of the first terminal device is less than or less than or equal to the first PPPP threshold, and/or PPPR of the to-be-sent data packet is greater than or greater than or equal to the first PPPR threshold, it is determined that the V2X sidelink resource is the first-standard V2X sidelink resource.

For example, the to-be-sent data packet of the first terminal device has the corresponding PPPP and/or PPPR. If the PPPP of the to-be-sent data packet is less than or less than or equal to the first PPPP threshold, it is determined that the V2X sidelink resource is the first-standard V2X sidelink resource. Alternatively, if the PPPR of the to-be-sent data packet is greater than or greater than or equal to the first PPPR threshold, it is determined that the V2X sidelink resource is the first-standard V2X sidelink resource. Alternatively, if the PPPP of the to-be-sent data packet is less than or less than or equal to the first PPPP threshold, and the PPPR of the to-be-sent data packet is greater than or greater than or equal to the first PPPR threshold, it is determined that the V2X sidelink resource is the first-standard V2X sidelink resource.

According to an existing standard, a smaller PPPP value indicates a higher priority of the to-be-sent data packet. Assuming that a larger PPPR value indicates a higher reliability requirement of the to-be-sent data, and it is considered that the first-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is greater than or greater than or equal to the first PPPR threshold, it is determined that the V2X sidelink resource is the first-standard V2X sidelink resource. In this way, the terminal device can select a proper V2X resource to satisfy a QoS requirement of the data packet.

If a PPPP of a to-be-sent data packet of the first terminal device is less than or less than or equal to the first PPPP threshold, and/or PPPR of the to-be-sent data packet is greater than or greater than or equal to the first PPPR threshold, it is determined that the V2X sidelink resource is the second-standard V2X sidelink resource.

For example, the to-be-sent data packet of the first terminal device has the corresponding PPPP and/or PPPR. If the PPPP of the to-be-sent data packet is less than or less than or equal to the first PPPP threshold, it is determined that the V2X sidelink resource is the second-standard V2X sidelink resource. Alternatively, if the PPPR of the to-be-sent data packet is greater than or greater than or equal to the first PPPR threshold, it is determined that the V2X sidelink resource is the second-standard V2X sidelink resource. Alternatively, if the PPPP of the to-be-sent data packet is less than or less than or equal to the first PPPP threshold, and the PPPR of the to-be-sent data packet is greater than or greater than or equal to the first PPPR threshold, it is determined that the V2X sidelink resource is the second-standard V2X sidelink resource.

According to an existing standard, a smaller PPPP value indicates a higher priority of the to-be-sent data packet. Assuming that a larger PPPR value indicates a higher reliability requirement of the to-be-sent data, and it is considered that the second-standard V2X sidelink resource may be used for transmission of data having a higher priority and/or a higher reliability requirement, when the PPPP of the to-be-sent data packet is less than or less than or equal to the first PPPP threshold, and/or when the PPPR of the to-be-sent data packet is greater than or greater than or equal to the first PPPR threshold, it is determined that the V2X sidelink resource is the second-standard V2X sidelink resource. In this way, the terminal device can select a proper V2X resource to satisfy a QoS requirement of the data packet.

Further, if the quality of service QoS parameter threshold further includes a second PPPP threshold and/or a second PPPR threshold, the manner in which the first terminal device determines the V2X sidelink resource according to the configuration rule satisfies any one of the following:

If the PPPP of the to-be-sent data packet of the first terminal device is less than or less than or equal to the second PPPP threshold, and/or the PPPR of the to-be-sent data packet is greater than or greater than or equal to the second PPPR threshold, it is determined that the V2X sidelink resources are the first-standard V2X sidelink resource and the second-standard V2X sidelink resource.

For example, the to-be-sent data packet of the first terminal device has the corresponding PPPP and/or PPPR. If the PPPP of the to-be-sent data packet is less than or less than or equal to the second PPPP threshold, it is determined that the V2X sidelink resources are the first-standard V2X sidelink resource and the second-standard V2X sidelink resource. Alternatively, if the PPPR of the to-be-sent data packet is greater than or greater than or equal to the first PPPR threshold, it is determined that the V2X sidelink resources are the first-standard V2X sidelink resource and the second-standard V2X sidelink resource. Alternatively, if the PPPP of the to-be-sent data packet is less than or less than or equal to the second PPPP threshold, and the PPPR of the to-be-sent data packet is greater than or greater than or equal to the first PPPR threshold, it is determined that the V2X sidelink resources are the first-standard V2X sidelink resource and the second-standard V2X sidelink resource.

According to the existing standard, the smaller PPPP value indicates the higher priority of the to-be-sent data packet. Assuming that the larger PPPR value indicates the higher reliability requirement of the to-be-sent data, and it is considered that using both the first-standard V2X sidelink resource and the second-standard V2X sidelink resource for transmission can satisfy a high priority requirement and/or a high reliability requirement of data, when the PPPP of the to-be-sent data packet is less than or less than or equal to the second PPPP threshold, and/or the PPPR of the to-be-sent data packet is greater than or greater than or equal to the second PPPR threshold, it is determined that the V2X sidelink resources are the first-standard V2X sidelink resource and the second-standard V2X sidelink resource. In this way, when the terminal device needs to transmit the data having the high priority requirement and/or the high reliability requirement, the terminal device can obtain the corresponding V2X sidelink resources to satisfy a QoS requirement of the data packet.

If the PPPP of the to-be-sent data packet of the first terminal device is less than or less than or equal to the second PPPP threshold, and/or the PPPR of the to-be-sent data packet is less than or less than or equal to the second PPPR threshold, it is determined that the V2X sidelink resources are the first-standard V2X sidelink resource and the second-standard V2X sidelink resource.

For example, the to-be-sent data packet of the first terminal device has the corresponding PPPP and/or PPPR. If the PPPP of the to-be-sent data packet is less than or less than or equal to the second PPPP threshold, it is determined that the V2X sidelink resources are the first-standard V2X sidelink resource and the second-standard V2X sidelink resource. Alternatively, if the PPPR of the to-be-sent data packet is less than or less than or equal to the first PPPR threshold, it is determined that the V2X sidelink resources are the first-standard V2X sidelink resource and the second-standard V2X sidelink resource. Alternatively, if the PPPP of the to-be-sent data packet is less than or less than or equal to the second PPPP threshold, and the PPPR of the to-be-sent data packet is less than or less than or equal to the first PPPR threshold, it is determined that the V2X sidelink resources are the first-standard V2X sidelink resource and the second-standard V2X sidelink resource.

According to the existing standard, the smaller PPPP value indicates the higher priority of the to-be-sent data packet. Assuming that the smaller PPPR value indicates the higher reliability requirement of the to-be-sent data, and it is considered that using both the first-standard V2X sidelink resource and the second-standard V2X sidelink resource for transmission can satisfy a high priority requirement and/or a high reliability requirement of data, when the PPPP of the to-be-sent data packet is less than or less than or equal to the second PPPP threshold, and/or the PPPR of the to-be-sent data packet is less than or less than or equal to the second PPPR threshold, it is determined that the V2X sidelink resources are the first-standard V2X sidelink resource and the second-standard V2X sidelink resource. In this way, when the terminal device needs to transmit the data having the high priority requirement and/or the high reliability requirement, the terminal device can obtain the corresponding V2X sidelink resources to satisfy a QoS requirement of the data packet.

Optionally, when the configuration rule includes the quality of service QoS parameter threshold, and the quality of service QoS parameter threshold includes a first quality of service flow indicator (QoS flow indicator, QFI) threshold, a manner in which the first terminal device determines the V2X sidelink resource according to the configuration rule satisfies any one of the following:

If a QFI of a to-be-sent data packet of the first terminal device is greater than or greater than or equal to the first QFI threshold, it is determined that the V2X sidelink resource is the first-standard V2X sidelink resource.

For example, the to-be-sent data packet of the first terminal device has the corresponding QFI. If the QFI of the to-be-sent data packet is greater than or greater than or equal to the first QFI threshold, it is determined that the V2X sidelink resource is the first-standard V2X sidelink resource. In this way, if a smaller QFI value indicates a higher QoS requirement, and it is considered that the first-standard V2X sidelink resource may be used to transmit data having a lower QoS requirement, the terminal device can select, according to the foregoing rule, appropriate V2X sidelink resources for data having different QoS requirements, to transmit the data.

If a QFI of a to-be-sent data packet of the first terminal device is greater than or greater than or equal to the first QFI threshold, it is determined that the V2X sidelink resource is the second-standard V2X sidelink resource.

For example, the to-be-sent data packet of the first terminal device has the corresponding QFI. If the QFI of the to-be-sent data packet is greater than or greater than or equal to the first QFI threshold, it is determined that the V2X sidelink resource is the second-standard V2X sidelink resource. In this way, if a smaller QFI value indicates a higher QoS requirement, and it is considered that the second-standard V2X sidelink resource may be used to transmit data having a lower QoS requirement, the terminal device can select, according to the foregoing rule, appropriate V2X sidelink resources for data having different QoS requirements, to transmit the data.

If a QFI of a to-be-sent data packet of the first terminal device is less than or less than or equal to the first QFI threshold, it is determined that the V2X sidelink resource is the first-standard V2X sidelink resource.

For example, the to-be-sent data packet of the first terminal device has the corresponding QFI. If the QFI of the to-be-sent data packet is less than or less than or equal to the first QFI threshold, it is determined that the V2X sidelink resource is the first-standard V2X sidelink resource. In this way, if a smaller QFI value indicates a higher QoS requirement, and it is considered that the first-standard V2X sidelink resource may be used to transmit data having a higher QoS requirement, the terminal device can select, according to the foregoing rule, appropriate V2X sidelink resources for data having different QoS requirements, to transmit the data.

If a QFI of a to-be-sent data packet of the first terminal device is less than or less than or equal to the first QFI threshold, it is determined that the V2X sidelink resource is the second-standard V2X sidelink resource.

For example, the to-be-sent data packet of the first terminal device has the corresponding QFI. If the QFI of the to-be-sent data packet is less than or less than or equal to the first QFI threshold, it is determined that the V2X sidelink resource is the second-standard V2X sidelink resource. In this way, if a smaller QFI value indicates a higher QoS requirement, and it is considered that the second-standard V2X sidelink resource may be used to transmit data having a higher QoS requirement, the terminal device can select, according to the foregoing rule, appropriate V2X sidelink resources for data having different QoS requirements, to transmit the data.

If a QFI of a to-be-sent data packet of the first terminal device is greater than or greater than or equal to the first QFI threshold, it is determined that the V2X sidelink resource is the first-standard V2X sidelink resource.

For example, the to-be-sent data packet of the first terminal device has the corresponding QFI. If the QFI of the to-be-sent data packet is greater than or greater than or equal to the first QFI threshold, it is determined that the V2X sidelink resource is the first-standard V2X sidelink resource. In this way, if a larger QFI value indicates a higher QoS requirement, and it is considered that the first-standard V2X sidelink resource may be used to transmit data having a higher QoS requirement, the terminal device can select, according to the foregoing rule, appropriate V2X sidelink resources for data having different QoS requirements, to transmit the data.

If a QFI of a to-be-sent data packet of the first terminal device is greater than or greater than or equal to the first QFI threshold, it is determined that the V2X sidelink resource is the second-standard V2X sidelink resource.

For example, the to-be-sent data packet of the first terminal device has the corresponding QFI. If the QFI of the to-be-sent data packet is greater than or greater than or equal to the first QFI threshold, it is determined that the V2X sidelink resource is the second-standard V2X sidelink resource. In this way, if a larger QFI value indicates a higher QoS requirement, and it is considered that the second-standard V2X sidelink resource may be used to transmit data having a higher QoS requirement, the terminal device can select, according to the foregoing rule, appropriate V2X sidelink resources for data having different QoS requirements, to transmit the data.

If a QFI of a to-be-sent data packet of the first terminal device is less than or less than or equal to the first QFI threshold, it is determined that the V2X sidelink resource is the first-standard V2X sidelink resource.

For example, the to-be-sent data packet of the first terminal device has the corresponding QFI. If the QFI of the to-be-sent data packet is less than or less than or equal to the first QFI threshold, it is determined that the V2X sidelink resource is the first-standard V2X sidelink resource. In this way, if a larger QFI value indicates a higher QoS requirement, and it is considered that the first-standard V2X sidelink resource may be used to transmit data having a lower QoS requirement, the terminal device can select, according to the foregoing rule, appropriate V2X sidelink resources for data having different QoS requirements, to transmit the data.

If a QFI of a to-be-sent data packet of the first terminal device is less than or less than or equal to the first QFI threshold, it is determined that the V2X sidelink resource is the second-standard V2X sidelink resource.

For example, the to-be-sent data packet of the first terminal device has the corresponding QFI. If the QFI of the to-be-sent data packet is less than or less than or equal to the first QFI threshold, it is determined that the V2X sidelink resource is the second-standard V2X sidelink resource. In this way, if a larger QFI value indicates a higher QoS requirement, and it is considered that the second-standard V2X sidelink resource may be used to transmit data having a lower QoS requirement, the terminal device can select, according to the foregoing rule, appropriate V2X sidelink resources for data having different QoS requirements, to transmit the data.

Further, when the configuration rule includes the quality of service QoS parameter threshold, and the quality of service QoS parameter threshold includes a second QFI threshold, the manner in which the first terminal device determines the V2X sidelink resource according to the configuration rule satisfies any one of the following:

If the QFI of the to-be-sent data packet of the first terminal device is greater than or greater than or equal to the second QFI threshold, it is determined that the V2X sidelink resources are the first-standard V2X sidelink resource and the second-standard V2X sidelink resource.

For example, the to-be-sent data packet of the first terminal device has the corresponding QFI. If the QFI of the to-be-sent data packet is greater than or greater than or equal to the second QFI threshold, it is determined that the V2X sidelink resource is the first-standard V2X sidelink resource and the second-standard V2X sidelink resource. In this way, if the larger QFI value indicates the higher QoS requirement, and it is considered that using both the first-standard V2X sidelink resource and the second-standard V2X sidelink resource can satisfy a high QoS requirement of data, an appropriate V2X sidelink resource may be selected, according to the foregoing method, for the data having the high QoS requirement, to transmit the data.

If the QFI of the to-be-sent data packet of the first terminal device is less than or less than or equal to the second QFI threshold, it is determined that the V2X sidelink resources are the first-standard V2X sidelink resource and the second-standard V2X sidelink resource.

For example, the to-be-sent data packet of the first terminal device has the corresponding QFI. If the QFI of the to-be-sent data packet is less than or less than or equal to the second QFI threshold, it is determined that the V2X sidelink resource is the first-standard V2X sidelink resource and the second-standard V2X sidelink resource. In this way, if the smaller QFI value indicates the higher QoS requirement, and it is considered that using both the first-standard V2X sidelink resource and the second-standard V2X sidelink resource can satisfy a high QoS requirement of data, an appropriate V2X sidelink resource may be selected, according to the foregoing method, for the data having the high QoS requirement, to transmit the data.

Optionally, if the configuration rule includes the sidelink quality threshold, the sidelink quality threshold may include a first channel busy ratio (Channel Busy Ratio, CBR) threshold and/or a second CBR threshold. In this case, a manner in which the first terminal device determines the V2X sidelink resource according to the configuration rule satisfies any one of the following:

If a first-standard V2X sidelink CBR obtained by the first terminal device through measurement is greater than or greater than or equal to the first CBR threshold, it is determined that the V2X sidelink resource is the second-standard V2X sidelink resource.

For example, the first CBR threshold is a first-standard V2X sidelink CBR threshold, and the first terminal device measures the first-standard V2X sidelink CBR. If the first terminal device determines that the first-standard V2X sidelink CBR obtained through measurement is greater than or greater than or equal to the first-standard V2X sidelink CBR threshold, the first terminal device determines that the V2X sidelink resource is the second-standard V2X sidelink resource.

When the first-standard V2X sidelink CBR obtained through measurement is greater than or greater than or equal to the first CBR threshold, that is, when a first-standard V2X sidelink channel is in a busy state, it is determined that the V2X sidelink resource is the second-standard V2X sidelink resource. In this way, the terminal device can select an idler V2X sidelink resource in real time to transmit data.

If a second-standard V2X sidelink CBR obtained by the first terminal device through measurement is less than or less than or equal to the second CBR threshold, it is determined that the V2X sidelink resource is the second-standard V2X sidelink resource.

For example, the second CBR threshold is a second-standard V2X sidelink CBR threshold, and the first terminal device measures the second-standard V2X sidelink CBR. If the first terminal device determines that the second-standard V2X sidelink CBR obtained through measurement is less than or less than or equal to the second-standard V2X sidelink CBR threshold, the first terminal device determines that the V2X sidelink resource is the second-standard V2X sidelink resource.

When the second-standard V2X sidelink CBR obtained through measurement is less than or less than or equal to the second CBR threshold, that is, when a second-standard V2X sidelink channel is in an idle state, it is determined that the V2X sidelink resource is the second-standard V2X sidelink resource. In this way, the terminal device can select an idler V2X sidelink resource in real time to transmit data.

If a first-standard V2X sidelink CBR obtained by the first terminal device through measurement is greater than or greater than or equal to the first CBR threshold, and a second-standard V2X sidelink CBR obtained by the first terminal device through measurement is less than or less than or equal to the second CBR threshold, it is determined that the V2X sidelink resource is the second-standard V2X sidelink resource.

For example, if the first terminal device determines, by measuring the first-standard V2X sidelink CBR and the second-standard V2X sidelink CBR, that the first-standard V2X sidelink CBR obtained through measurement is greater than or greater than or equal to the first CBR threshold, and the second-standard V2X sidelink CBR obtained through measurement is less than or less than or equal to the second CBR threshold, the first terminal device determines that the V2X sidelink resource is the second-standard V2X sidelink resource.

When the first-standard V2X sidelink CBR obtained through measurement is greater than or greater than or equal to the first CBR threshold, and the second-standard V2X sidelink CBR obtained by the first terminal device through measurement is less than or less than or equal to the second CBR threshold, that is, when a first-standard V2X sidelink channel is in a busy state, and a second-standard V2X sidelink channel is in an idle state, it is determined that the V2X sidelink resource is the second-standard V2X sidelink resource. In this way, the terminal device can select an idler V2X sidelink resource in real time to transmit data.

If a first-standard V2X sidelink CBR obtained by the first terminal device through measurement is less than or less than or equal to the first CBR threshold, it is determined that the V2X sidelink resource is the first-standard V2X sidelink resource.

For example, the first CBR threshold is a first-standard V2X sidelink CBR threshold, and the first terminal device measures a first-standard V2X sidelink CBR. If the first terminal device determines that the first-standard V2X sidelink CBR obtained through measurement is less than or less than or equal to the first-standard V2X sidelink CBR threshold, the first terminal device determines that the V2X sidelink resource is the first-standard V2X sidelink resource.

When the first-standard V2X sidelink CBR obtained through measurement is less than or less than or equal to the first CBR threshold, that is, when a first-standard V2X sidelink channel is in an idle state, it is determined that the V2X sidelink resource is the first-standard V2X sidelink resource. In this way, the terminal device can select an idler V2X sidelink resource in real time to transmit data.

If a second-standard V2X sidelink CBR obtained by the first terminal device through measurement is greater than or greater than or equal to the second CBR threshold, it is determined that the V2X sidelink resource is the first-standard V2X sidelink resource.

For example, the second CBR threshold is a second-standard V2X sidelink CBR threshold, and the first terminal device measures the second-standard V2X sidelink CBR. If the first terminal device determines that the second-standard V2X sidelink CBR obtained through measurement is greater than or greater than or equal to the second-standard V2X sidelink CBR threshold, the first terminal device determines that the V2X sidelink resource is the second-standard V2X sidelink resource.

When the second-standard V2X sidelink CBR obtained through measurement is greater than or greater than or equal to the second CBR threshold, that is, when a second-standard V2X sidelink channel is in a busy state, it is determined that the V2X sidelink resource is the first-standard V2X sidelink resource. In this way, the terminal device can select an idler V2X sidelink resource in real time to transmit data.

If a first-standard V2X sidelink CBR obtained by the first terminal device through measurement is less than or less than or equal to the first CBR threshold, and a second-standard V2X sidelink CBR obtained by the first terminal device through measurement is greater than or greater than or equal to the second CBR threshold, it is determined that the V2X sidelink resource is the first-standard V2X sidelink resource.

For example, if the first terminal device determines, by measuring the first-standard V2X sidelink CBR and the second-standard V2X sidelink CBR, that the first-standard V2X sidelink CBR obtained through measurement is less than or less than or equal to the first CBR threshold, and the second-standard V2X sidelink CBR obtained through measurement is greater than or greater than or equal to the second CBR threshold, the first terminal device determines that the V2X sidelink resource is the first-standard V2X sidelink resource.

When the first-standard V2X sidelink CBR obtained through measurement is less than or less than or equal to the first CBR threshold, and the second-standard V2X sidelink CBR obtained by the first terminal device through measurement is greater than or greater than or equal to the second CBR threshold, that is, when a first-standard V2X sidelink channel is in an idle state, and a second-standard V2X sidelink channel is in a busy state, it is determined that the V2X sidelink resource is the second-standard V2X sidelink resource. In this way, the terminal device can select an idler V2X sidelink resource in real time to transmit data.

Optionally, the quality of service QoS parameter is alternatively another parameter such as a delay or a rate. The first terminal device may alternatively determine the V2X sidelink resource based on the parameters. The sidelink quality threshold may alternatively be another V2X sidelink quality parameter threshold, and is not limited to the V2X sidelink CBR.

The foregoing manners of obtaining the V2X sidelink resource can enable the network device to implement more flexible control based on information such as an air interface or load. In this case, when the first terminal device reports the SR or the BSR, the SR or the BSR carries a corresponding PPPP/corresponding PPPR/a corresponding service type or a similar QoS parameter. The network device indicates, in scheduling information, whether the allocated resource is the first-standard V2X sidelink resource or the second-standard V2X sidelink resource. For example, the SPS configuration is also similar. When reporting the UE assistance information message, the first terminal device reports a service type, a PPPP/PPPR, or a related service QoS parameter. The network device determines whether to allocate a first-standard V2X sidelink SPS resource or a second-standard V2X sidelink SPS resource, and indicates, to the first terminal device in a radio resource control (radio resource control, RRC) configuration, whether to allocate the first-standard V2X sidelink SPS resource or the second-standard V2X sidelink SPS resource.

Optionally, the configuration rule is sent by the core network device to the first terminal device, or is generated by an application layer inside the first terminal device and sent by the application layer to an access stratum (access stratum, AS) of the first terminal device.

For example, a V2X control function (control function) entity on a core network side may formulate the configuration rule, and then, notify the first terminal device by using a non-access stratum (non-access stratum, NAS) message, an RRC message, or a user plane bearer.

When obtaining the V2X sidelink resource according to the configuration rule sent by the network device, the first terminal device may first obtain information indicating that the second terminal device supports the first-standard V2X service and information indicating that the second terminal device supports the second-standard V2X service, and then, select the V2X sidelink resource based on the information indicating that the second terminal device supports the first-standard V2X service and the information indicating that the second terminal device supports the second-standard V2X service.

For example, before selecting the V2X sidelink resource, the first terminal device first learns of whether the second terminal device can support the first-standard V2X service, whether the second terminal device can support the second-standard V2X service, or whether the second terminal device can support both the first-standard V2X service and the second-standard V2X service. In an implementation process, the first terminal device may obtain, by using a V2X control function (control function), from the network device, or by using an application (application, APP) installed in the first terminal device, whether the second terminal device can support the first-standard V2X service, whether the second terminal device can support the second-standard V2X service, or whether the second terminal device can support both the first-standard V2X service and the second-standard V2X service.

When learning of that the second terminal device can support both the first-standard V2X service and the second-standard V2X service, the first terminal device selects the V2X sidelink resource in the foregoing manner.

Optionally, if the first terminal device learns of that the second terminal device can support only the first-standard V2X service, correspondingly, the first terminal device selects the first-standard V2X sidelink resource. Alternatively, if the first terminal device learns of that the second terminal device can support only the second-standard V2X service, correspondingly, the first terminal device may select the second-standard V2X sidelink resource.

In yet another possible implementation, to make the V2X sidelink resource determined by the network device more proper, the network device is usually enabled to learn of statuses of the first-standard V2X sidelink resource and the second-standard V2X sidelink resource that can be obtained by the first terminal device and even the network device provides Uu interface selection for the first terminal device. The network device delivers a measurement configuration to the first terminal device, and the first terminal device measures V2X sidelinks after receiving the measurement configuration sent by the network device. The measurement configuration may include the measurement event. When a measurement result of a first-standard V2X sidelink and/or a measurement result of a second-standard V2X sidelink that are/is obtained by the first terminal device through measurement satisfy/satisfies the event, the first terminal device may send a measurement report to the network device. The measurement report includes the measurement result of the first-standard V2X sidelink and/or the measurement result of the second-standard V2X sidelink. Optionally, the measurement report includes the measurement result of the first-standard V2X sidelink and/or the measurement result of the second-standard V2X sidelink that satisfy/satisfies the measurement event. The network device allocates the V2X sidelink resource to the first terminal device based on the measurement report sent by the first terminal device.

For example, the measurement event sent by the network device and received by the first terminal device includes any one of the following: A first-standard V2X sidelink channel busy ratio SL CBR is greater than or greater than or equal to a second threshold; a second-standard V2X SL CBR is less than or less than or equal to a third threshold; a first-standard V2X sidelink channel busy ratio SL CBR is greater than or greater than or equal to a second threshold, and a second-standard V2X SL CBR is less than or less than or equal to a third threshold; a first-standard V2X SL CBR is less than or less than or equal to a fourth threshold; a second-standard V2X SL CBR is greater than or greater than or equal to a fifth threshold; a first-standard V2X SL CBR is less than or less than or equal to a fourth threshold, and a second-standard V2X SL CBR is greater than or greater than or equal to a fifth threshold; a first-standard V2X SL CBR is greater than or greater than or equal to a sixth threshold, and a reference signal received power (reference signal received power, RSRP) is greater than or greater than or equal to a seventh threshold; a second-standard V2X SL CBR is greater than or greater than or equal to a sixth threshold, and an RSRP is greater than or greater than or equal to a seventh threshold; a first-standard V2X SL CBR is greater than or greater than or equal to a sixth threshold, and reference signal received quality (reference signal received quality, RSRQ) is greater than or greater than or equal to a seventh threshold; a second-standard V2X SL CBR is greater than or greater than or equal to a sixth threshold, and RSRQ is greater than or greater than or equal to a seventh threshold; a first-standard V2X SL CBR is less than or less than or equal to an eighth threshold, and an RSRP is less than or less than or equal to a ninth threshold; a first-standard V2X SL CBR is less than or less than or equal to an eighth threshold, and RSRQ is less than or less than or equal to a ninth threshold; a second-standard V2X SL CBR is less than or less than or equal to an eighth threshold, and an RSRP is less than or less than or equal to a ninth threshold; a second-standard V2X SL CBR is less than or less than or equal to an eighth threshold, and RSRQ is less than or less than or equal to a ninth threshold; and a first-standard V2X SL CBR is less than or less than or equal to a tenth threshold, and a second-standard V2X SL CBR is less than or less than or equal to an eleventh threshold.

For example, the network device sends the measurement event to the first terminal device. When determining that a measurement result satisfies the measurement event, the first terminal device sends a measurement report to the network device. For example, if the measurement event is that the first-standard V2X sidelink SL CBR is greater than or equal to the second threshold and the second-standard V2X SL CBR is less than or equal to the third threshold, when a result, obtained by the first terminal device through measurement, of the first-standard V2X SL CBR is greater than or equal to the second threshold and a result, obtained by the first terminal device through measurement, of the second-standard V2X SL CBR is less than or equal to the third threshold, the first terminal device sends the measurement report to the network device. The measurement report includes the result of the first-standard V2X SL CBR and/or the result of the second-standard V2X SL CBR. Optionally, the result of the first-standard V2X SL CBR and/or the result of the second-standard V2X SL CBR include/includes at least a result of the first-standard V2X SL CBR and/or a result of the second-standard V2X SL CBR that satisfy/ satisfies the measurement event.

A manner in which the first terminal device reports the measurement report to the network device and that is used when the measurement event is other information is similar to a manner of reporting the measurement report to the network device and used when the measurement event is that the first-standard V2X sidelink SL CBR is greater than or equal to the second threshold and the second-standard V2X SL CBR is less than or equal to the third threshold. Details are not described herein again.

After receiving the measurement report sent by the first terminal device, the network device determines the V2X sidelink resource based on the measurement report.

For example, if the first-standard V2X sidelink channel busy ratio SL CBR is greater than or greater than or equal to the second threshold, the second-standard V2X SL CBR is less than or less than or equal to the third threshold, or when the first-standard V2X sidelink channel busy ratio SL CBR is greater than or greater than or equal to the second threshold and the second-standard V2X SL CBR is less than or less than or equal to the third threshold, it is determined that the V2X sidelink resource is the second-standard V2X sidelink resource.

If the first-standard V2X SL CBR is less than or less than or equal to the fourth threshold, the second-standard V2X SL CBR is greater than or greater than or equal to the fifth threshold, or when the first-standard V2X SL CBR is less than or less than or equal to the fourth threshold and the second-standard V2X SL CBR is greater than or greater than or equal to the fifth threshold, it is determined that the V2X sidelink resource is the first-standard V2X sidelink resource.

If the first-standard V2X SL CBR is greater than or greater than or equal to the sixth threshold and the RSRP is greater than or greater than or equal to the seventh threshold, the second-standard V2X SL CBR is greater than or greater than or equal to the sixth threshold and the RSRP is greater than or greater than or equal to the seventh threshold, the first-standard V2X SL CBR is greater than or greater than or equal to the sixth threshold and the RSRQ is greater than or greater than or equal to the seventh threshold, or the second-standard V2X SL CBR is greater than or greater than or equal to the sixth threshold and the RSRQ is greater than or greater than or equal to the seventh threshold, it is determined that the V2X sidelink resource is a Uu interface resource.

If the first-standard V2X SL CBR is less than or less than or equal to the eighth threshold and the RSRP is less than or less than or equal to the ninth threshold, or the first-standard V2X SL CBR is less than or less than or equal to the eighth threshold and the RSRQ is less than or less than or equal to the ninth threshold, it is determined that the V2X sidelink resource is the first-standard V2X sidelink resource.

If the second-standard V2X SL CBR is less than or less than or equal to the eighth threshold and the RSRP is less than or less than or equal to the ninth threshold, or the second-standard V2X SL CBR is less than or less than or equal to the eighth threshold and the RSRQ is less than or less than or equal to the ninth threshold, it is determined that the V2X sidelink resource is the second-standard V2X sidelink resource.

If the first-standard V2X SL CBR is less than or less than or equal to the tenth threshold, and the second-standard V2X SL CBR is less than or less than or equal to the eleventh threshold, it is determined that the V2X sidelink resources are the first-standard V2X sidelink resource and the second-standard V2X sidelink resource.

After determining the V2X sidelink resource, the network device sends the determined V2X sidelink resource to the first terminal device.

Regardless of which manner is used to determine the V2X sidelink resource, it is considered that the first terminal device currently accesses only one network device, for example, accesses a first-standard network device. In this case, when the first terminal device reports the second message to the first-standard network device, the first-standard V2X sidelink resource may be requested, or the second-standard V2X sidelink resource may be requested. In this case, a second message corresponding to the first-standard V2X sidelink resource may be used. To be specific, no matter which standard of a V2X sidelink resource is requested, a unified second message is used for requesting. For example, the second message is the BSR. In this case, the first terminal device may request the first-standard V2X sidelink resource or the second-standard V2X sidelink resource by using a first-standard BSR. Optionally, the first-standard BSR includes a second-standard BSR. The first-standard BSR is used to request the first-standard V2X sidelink resource, and the second-standard BSR is used to request the second-standard V2X sidelink resource. If the second message is the terminal device assistance information, the first terminal device may request the first-standard V2X sidelink resource or the second-standard V2X sidelink resource by using a first-standard terminal device assistance information message. Optionally, the first-standard terminal device assistance information message includes a second-standard terminal device assistance information message. The first-standard terminal device assistance information message is used to report a V2X service model that requires the first-standard V2X sidelink resource, and the second-standard terminal device assistance information message is used to report a V2X service model that requires the second-standard V2X sidelink resource.

The network device allocates one or more V2X resources to the first terminal device based on the request of the first terminal device or based on a decision of the network device, and indicates the one or more allocated V2X resources to the first terminal device by using downlink control information (downlink control information, DCI). The one or more V2X resources may be the first-standard V2X sidelink resource, the second-standard V2X sidelink resource, or the first-standard V2X sidelink resource and the second-standard V2X sidelink resource. For example, DCI for scheduling the first-standard V2X sidelink resource and DCI for scheduling the second-standard V2X sidelink resource may be in different formats (format). For example, DCI-1 is used to schedule the first-standard V2X sidelink resource, and DCI-2 is used to schedule the second-standard V2X sidelink resource. Optionally, the DCI for scheduling the first-standard V2X sidelink resource and the DCI for scheduling the second-standard V2X sidelink resource are alternatively in a same format. In this case, the first-standard V2X sidelink resource and the second-standard V2X sidelink resource are further indicated in the DCI.

Step 303: The first terminal device communicates with the second terminal device on the V2X sidelink resource.

In this embodiment, after obtaining the V2X sidelink resource used for data transmission, the first terminal device communicates with the second terminal device by using the obtained V2X sidelink resource. The resource obtained by the first terminal device includes the first-standard V2X sidelink resource and/or the second-standard V2X sidelink resource. In this way, the first terminal device may complete the first-standard V2X service and/or the second-standard V2X service.

Optionally, if the second terminal device can support both the first-standard V2X service and the second-standard V2X service, the second terminal device listens to both scheduling information on the first-standard V2X sidelink and scheduling information on the second-standard V2X sidelink. However, the foregoing manner affects power consumption of the second terminal device. Therefore, optionally, a set of baseline links is also defined. It is notified that all terminal devices can support the baseline links in a system by default. For example, in an NR system, all terminal devices support NR V2X by default, and an NR V2X sidelink resource is used for initial transmission.

For a manner in which the first terminal device sends data by using a duplication (duplication) configuration and the second terminal device performs receiving in a dual-link manner, a possible implementation manner is that a plurality of configurations may be preset and the first terminal device selects one of the plurality of standardized configurations for sending and indicates the selected configuration to the second terminal device in a scheduling assignment (scheduling assignment). The second terminal device learns of, in an SA parsing process, that the data is transmitted in the dual-link manner, and a corresponding L2 entity may be established to receive the data.

According to the communication method provided in this embodiment of this application, the first terminal device receives the first-standard V2X sidelink configuration and the second-standard V2X sidelink configuration from the network device, obtains, based on the first-standard V2X sidelink configuration and the second-standard V2X sidelink configuration, the V2X sidelink resource used for data transmission, and then, communicates with the second terminal device on the V2X sidelink resource. The first terminal device may obtain the first-standard V2X sidelink configuration and the second-standard V2X sidelink configuration from the network device, thereby determining, based on the foregoing two configurations, that the V2X sidelink resource used for data transmission is the first-standard V2X sidelink resource and/or the second-standard V2X sidelink resource, so that the first terminal device performs first-standard V2X service communication and/or second-standard V2X service communication with the second terminal device based on the determined V2X sidelink resource. In this way, it can be ensured that a same terminal device can obtain the first-standard V2X service and the second-standard V2X service.

Figure 4:
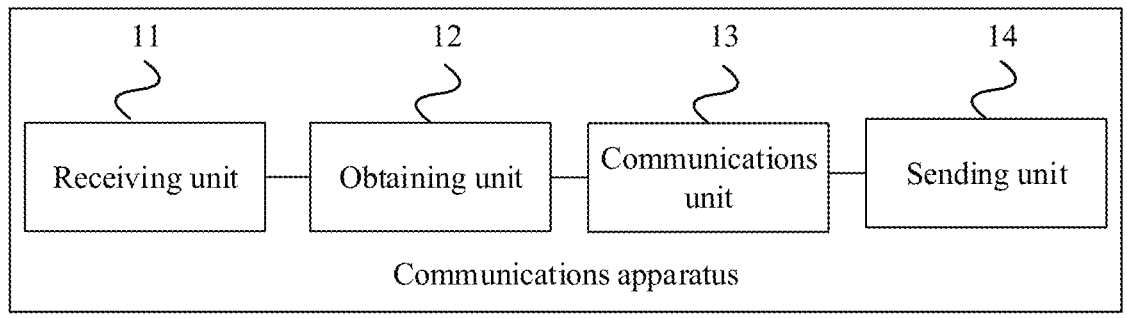
FIG. 4 is a schematic structural diagram of a communications apparatus according to an embodiment of this application.

FIG. 4 is a schematic structural diagram of a communications apparatus according to an embodiment of this application. Referring to FIG. 4, the apparatus includes a receiving unit 11, an obtaining unit 12, and a communications unit 13. For example, the receiving unit 11 is configured to receive a first-standard vehicle-to-everything V2X sidelink configuration and a second-standard V2X sidelink configuration from a network device;

the obtaining unit 12 is configured to obtain, based on the first-standard V2X sidelink configuration and the second-standard V2X sidelink configuration, a V2X sidelink resource used for data transmission; and the communications unit 13 is configured to communicate with a second terminal device on the V2X sidelink resource.

The communications apparatus provided in this embodiment of this application may perform the foregoing corresponding method embodiment. Implementation principles and technical effects of the communications apparatus are similar to those in the method embodiment. Details are not described herein again.

Optionally, the apparatus further includes:

a sending unit 14, configured to send, to the network device, information indicating that the first terminal device supports a first-standard V2X service and information indicating that the first terminal device supports a second-standard V2X service.

Optionally, the obtaining unit 12 is specifically configured to:

receive a first message broadcast by the network device, where the first message includes an identifier of an area, a first-standard V2X sidelink configuration corresponding to the area, and a second-standard V2X sidelink configuration corresponding to the area, the first-standard V2X sidelink configuration includes available first-standard V2X sidelink resources, and the second-standard V2X sidelink configuration includes available second-standard V2X sidelink resources, where the first terminal device selects at least one of the available first-standard V2X sidelink resources and/or at least one of the available second-standard V2X sidelink resources when the first terminal device is currently in the area.

Optionally, the obtaining unit 12 is specifically configured to:

send a second message to the network device, where the second message carries at least one piece of information used to indicate a network standard; and receive the V2X sidelink resource sent by the network device based on the network standard.

Optionally, the obtaining unit 12 is specifically configured to:

receive a configuration rule sent by the network device, where the configuration rule includes any one of the following information: a mapping relationship between a V2X service type and a resource, a mapping relationship between a quality of service QoS parameter and a resource, a quality of service QoS parameter threshold, and for example, a sidelink quality threshold, and the sidelink quality threshold includes a first-standard V2X sidelink quality threshold and/or a second-standard V2X sidelink quality threshold; and determine the V2X sidelink resource according to the configuration rule.

Optionally, the configuration rule includes the quality of service QoS parameter threshold, and the quality of service QoS parameter threshold includes a first prose per-packet priority PPPP threshold and/or a first prose per-packet reliability PPPR threshold; and the obtaining unit 12 is specifically configured to:

if a PPPP of a to-be-sent data packet of the first terminal device is greater than or greater than or equal to the first PPPP threshold, and/or PPPR of the to-be-sent data packet is greater than or greater than or equal to the first PPPR threshold, determine that the V2X sidelink resource is a first-standard V2X sidelink resource;

if a PPPP of a to-be-sent data packet of the first terminal device is greater than or greater than or equal to the first PPPP threshold, and/or PPPR of the to-be-sent data packet is greater than or greater than or equal to the first PPPR threshold, determine that the V2X sidelink resource is a second-standard V2X sidelink resource;

if a PPPP of a to-be-sent data packet of the first terminal device is greater than or greater than or equal to the first PPPP threshold, and/or PPPR of the to-be-sent data packet is less than or less than or equal to the first PPPR threshold, determine that the V2X sidelink resource is a first-standard V2X sidelink resource;

if a PPPP of a to-be-sent data packet of the first terminal device is greater than or greater than or equal to the first PPPP threshold, and/or PPPR of the to-be-sent data packet is less than or less than or equal to the first PPPR threshold, determine that the V2X sidelink resource is a second-standard V2X sidelink resource;

if a PPPP of a to-be-sent data packet of the first terminal device is less than or less than or equal to the first PPPP threshold, and/or PPPR of the to-be-sent data packet is less than or less than or equal to the first PPPR threshold, determine that the V2X sidelink resource is a first-standard V2X sidelink resource;

if a PPPP of a to-be-sent data packet of the first terminal device is less than or less than or equal to the first PPPP threshold, and/or PPPR of the to-be-sent data packet is less than or less than or equal to the first PPPR threshold, determine that the V2X sidelink resource is a second-standard V2X sidelink resource;

if a PPPP of a to-be-sent data packet of the first terminal device is less than or less than or equal to the first PPPP threshold, and/or PPPR of the to-be-sent data packet is greater than or greater than or equal to the first PPPR threshold, determine that the V2X sidelink resource is a first-standard V2X sidelink resource; or if a PPPP of a to-be-sent data packet of the first terminal device is less than or less than or equal to the first PPPP threshold, and/or PPPR of the to-be-sent data packet is greater than or greater than or equal to the first PPPR threshold, determine that the V2X sidelink resource is a second-standard V2X sidelink resource.

Optionally, the quality of service QoS parameter threshold further includes a second PPPP threshold and/or a second PPPR threshold; and the obtaining unit 12 is specifically configured to:

if the PPPP of the to-be-sent data packet of the first terminal device is less than or less than or equal to the second PPPP threshold, and/or the PPPR of the to-be-sent data packet is greater than or greater than or equal to the second PPPR threshold, determine that the V2X sidelink resources are the first-standard V2X sidelink resource and the second-standard V2X sidelink resource; or if the PPPP of the to-be-sent data packet of the first terminal device is less than or less than or equal to the second PPPP threshold, and/or the PPPR of the to-be-sent data packet is less than or less than or equal to the second PPPR threshold, determine that the V2X sidelink resources are the first-standard V2X sidelink resource and the second-standard V2X sidelink resource.

Optionally, the configuration rule includes the quality of service QoS parameter threshold, and the quality of service QoS parameter threshold includes a first quality of service flow indicator QFI threshold; and the obtaining unit 12 is specifically configured to:

if a QFI of a to-be-sent data packet of the first terminal device is greater than or greater than or equal to the first QFI threshold, determine that the V2X sidelink resource is a first-standard V2X sidelink resource;

if a QFI of a to-be-sent data packet of the first terminal device is greater than or greater than or equal to the first QFI threshold, determine that the V2X sidelink resource is a second-standard V2X sidelink resource;

if a QFI of a to-be-sent data packet of the first terminal device is less than or less than or equal to the first QFI threshold, determine that the V2X sidelink resource is a first-standard V2X sidelink resource; or if a QFI of a to-be-sent data packet of the first terminal device is less than or less than or equal to the first QFI threshold, determine that the V2X sidelink resource is a second-standard V2X sidelink resource.

Optionally, the quality of service QoS parameter threshold includes a second quality of service flow indicator QFI threshold; and the obtaining unit 12 is specifically configured to:

if the QFI of the to-be-sent data packet of the first terminal device is greater than or greater than or equal to the second QFI threshold, determine that the V2X sidelink resources are the first-standard V2X sidelink resource and the second-standard V2X sidelink resource; or if the QFI of the to-be-sent data packet of the first terminal device is less than or less than or equal to the second QFI threshold, determine that the V2X sidelink resources are the first-standard V2X sidelink resource and the second-standard V2X sidelink resource.

Optionally, the configuration rule includes the sidelink quality threshold, and the sidelink quality threshold includes a first channel busy ratio CBR threshold and/or a second CBR threshold; and the obtaining unit 12 is specifically configured to:

if a first-standard V2X sidelink CBR obtained by the first terminal device through measurement is greater than or greater than or equal to the first CBR threshold, and/or a second-standard V2X sidelink CBR obtained by the first terminal device through measurement is less than or less than or equal to the second CBR threshold, determine that the V2X sidelink resource is a second-standard V2X sidelink resource; or if a first-standard V2X sidelink CBR obtained by the first terminal device through measurement is less than or less than or equal to the first CBR threshold, and/or a second-standard V2X sidelink CBR obtained by the first terminal device through measurement is greater than or greater than or equal to the second CBR threshold, determine that the V2X sidelink resource is a first-standard V2X sidelink resource.

Optionally, the receiving unit 11 is further configured to receive a measurement event sent by the network device; and the measurement event includes any one of the following:

a first-standard V2X sidelink channel busy ratio SL CBR is greater than or greater than or equal to a second threshold, and/or a second-standard V2X SL CBR is less than or less than or equal to a third threshold;

a first-standard V2X SL CBR is less than or less than or equal to a fourth threshold, and/or a second-standard V2X SL CBR is greater than or greater than or equal to a fifth threshold;

a first-standard V2X SL CBR or a second-standard V2X SL CBR is greater than or greater than or equal to a sixth threshold, and a reference signal received power RSRP or reference signal received quality RSRQ is greater than or greater than or equal to a seventh threshold; or a first-standard V2X SL CBR or a second-standard V2X SL CBR is less than or less than or equal to an eighth threshold, and a RSRP or RSRQ is less than or less than or equal to a ninth threshold.

Optionally, the obtaining unit 12 is further configured to:

obtain information indicating that the second terminal device supports the first-standard V2X service and information indicating that the second terminal device supports the second-standard V2X service; and select the V2X sidelink resource based on the information indicating that the second terminal device supports the first-standard V2X service and the information indicating that the second terminal device supports the second-standard V2X service.

Optionally, the sending unit 14 is further configured to:

send a device identifier of the second terminal device to the network device, where the device identifier is used to indicate the network device to allocate the V2X sidelink resource to the first terminal device, or is used by the first terminal device to obtain, from the network device, the information indicating that the second terminal device supports the first-standard V2X service and the information indicating that the second terminal device supports the second-standard V2X service.

Optionally, a first V2X sidelink and a second V2X sidelink use a same V2X synchronization type and a same SL-V-RNTI.

The communications apparatus provided in this embodiment of this application may perform the foregoing corresponding method embodiment. The implementation principles and the technical effects of the communications apparatus are similar to those in the method embodiment. Details are not described herein again.

For example, it should be understood that, division into the units of the apparatus is merely logical function division, and during actual implementation, all or some of the units may be integrated into a physical entity, or the units may be physically separate. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be a processing element disposed separately, or may be integrated into a chip of the apparatus for implementation. In addition, the sending unit may be stored in a memory of the apparatus in a form of a program, and invoked by a processing element of the apparatus to perform the function of the sending unit. Implementation of other units is similar to that of the sending unit. Optionally, the units are all or partially integrated, or are implemented independently. The processing element herein may be an integrated circuit and has a signal processing capability. In an implementation process, the steps in the foregoing method or the foregoing units can be implemented by using a hardware integrated logic circuit in the processing element or by using instructions in a form of software. Optionally, the foregoing sending unit is a sending control unit, and sends information by using a sending apparatus of the apparatus, for example, an antenna and a radio frequency apparatus.

The foregoing units may be configured as one or more integrated circuits for implementing the foregoing method, for example, one or more application specific integrated circuits (application specific integrated circuit, ASIC), one or more microprocessors (digital signal processor, DSP), or one or more field programmable gate arrays (field programmable gate array, FPGA). For another example, when a unit is implemented by scheduling a program by a processing element, the processing component may be a general purpose processor, for example, a central processing unit (central processing unit, CPU) or another processor that can invoke the program. For another example, the units may be integrated together and implemented in a form of a system-on-a-chip (system-on-a-chip, SOC).

Figure 5:
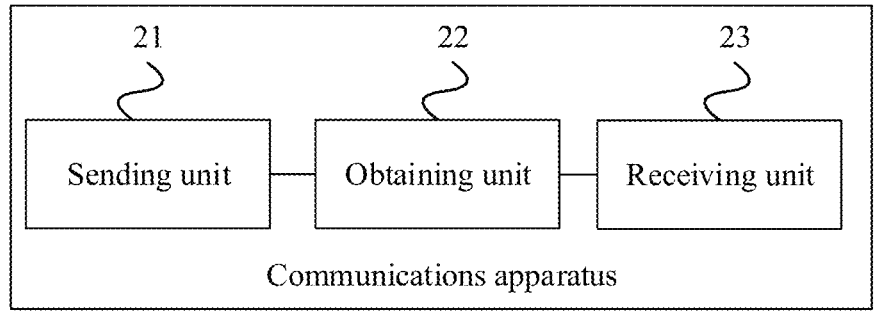
FIG. 5 is another schematic structural diagram of a communications apparatus according to an embodiment of this application.

FIG. 5 is another schematic structural diagram of a communications apparatus according to an embodiment of this application. Referring to FIG. 5, the apparatus includes a sending unit 21, an obtaining unit 22, and a receiving unit 23. For example, The sending unit 21 is configured to send a first-standard vehicle-to-everything V2X sidelink configuration and/or a second-standard V2X sidelink configuration to a first terminal device, where the first-standard V2X sidelink configuration and/or the second-standard V2X sidelink configuration are/is used by the first terminal device to obtain a V2X sidelink resource used for data transmission and communicate with a second terminal device on the V2X sidelink resource.

Optionally, the obtaining unit 22 is configured to obtain any one or more of the following information: information indicating that the first terminal device supports a first-standard V2X service, information indicating that the first terminal device supports a second-standard V2X service, grant information of the first terminal device, and sidelink aggregate maximum bit rates AMBRs of the first terminal device, where for example, the sidelink AMBRs include a first-standard V2X sidelink AMBR and a second-standard V2X sidelink AMBR; and the sending unit 21 is specifically configured to:
send, the first-standard V2X sidelink configuration and/or the second-standard V2X sidelink configuration to the first terminal device based on the any one or more of the information indicating that the first terminal device supports the first-standard V2X service, the information indicating that the first terminal device supports the second-standard V2X service, the grant information, and the sidelink AMBRs.

Optionally, the sending unit 21 is further configured to:
broadcast a first message to the first terminal device, where the first message includes an identifier of an area, a first-standard V2X sidelink configuration corresponding to the area, and a second-standard V2X sidelink configuration corresponding to the area, the first-standard V2X sidelink configuration includes available first-standard V2X sidelink resources, the second-standard V2X sidelink configuration includes available second-standard V2X sidelink resources, and the identifier of the area is used to indicate the first terminal device to select at least one of the available first-standard V2X sidelink resources and/or at least one of the available second-standard V2X sidelink resources when the first terminal device is currently in the area.

Optionally, the apparatus further includes:
the receiving unit 23, configured to receive a second message sent by the first terminal device, where the second message carries at least one piece of information used to indicate a network standard;
the obtaining unit 22 is further configured to determine the V2X sidelink resource based on the network standard; and
the sending unit 21 is further configured to send the V2X sidelink resource to the first terminal device.

Optionally, the sending unit 21 is further configured to:
send a configuration rule to the first terminal device, where the configuration rule includes any one of the following information: a mapping relationship between a V2X service type and a resource, a mapping relationship between a quality of service QoS parameter and a resource, a quality of service QoS parameter threshold, and a sidelink quality threshold, for example, the sidelink quality threshold includes a first-standard V2X sidelink quality threshold and/or a second-standard V2X sidelink quality threshold, and the configuration rule is used by the first terminal device to determine the V2X sidelink resource.

Optionally, the sending unit 21 is further configured to send a measurement event to the first terminal device;
the receiving unit 23 is further configured to receive a measurement report sent by the first terminal device, where the measurement report is sent by the first terminal device when the first terminal device determines that the measurement event satisfies a preset condition;
the obtaining unit 22 is further configured to determine the V2X sidelink resource based on the measurement report; and
the sending unit 21 is further configured to send the V2X sidelink resource to the first terminal device.

Optionally, the measurement event includes any one of the following:
a first-standard V2X sidelink channel busy ratio SL CBR is greater than or greater than or equal to a second threshold, and/or a second-standard V2X SL CBR is less than or less than or equal to a third threshold;
a first-standard V2X SL CBR is less than or less than or equal to a fourth threshold, and/or a second-standard V2X SL CBR is greater than or greater than or equal to a fifth threshold;
a first-standard V2X SL CBR or a second-standard V2X SL CBR is greater than or greater than or equal to a sixth threshold, and a reference signal received power RSRP or reference signal received quality RSRQ is greater than or greater than or equal to a seventh threshold; or a first-standard V2X SL CBR or a second-standard V2X SL CBR is less than or less than or equal to an eighth threshold, and a RSRP or RSRQ is less than or less than or equal to a ninth threshold.

Optionally, the receiving unit 23 is further configured to receive a device identifier, sent by the first terminal device, of the second terminal device;

the obtaining unit 22 is further configured to obtain, based on the device identifier, information indicating that the second terminal device supports the first-standard V2X service and information indicating that the second terminal device supports the second-standard V2X service; and the obtaining unit 22 is further configured to determine the V2X sidelink resource based on the information indicating that the second terminal device supports the first-standard V2X service and the information indicating that the second terminal device supports the second-standard V2X service.

Optionally, the sending unit 21 is further configured to send, to the first terminal device, the information indicating that the second terminal device supports the first-standard V2X service and the information indicating that the second terminal device supports the second-standard V2X service.

Optionally, the grant information includes at least one of the following information: whether the first terminal device is granted as a first-standard vehicle terminal device, whether the first terminal device is granted as a first-standard pedestrian terminal device, whether the first terminal device is granted as a second-standard vehicle terminal device, and whether the first terminal device is granted as a second-standard pedestrian terminal device.

Optionally, a first V2X sidelink and a second V2X sidelink use a same V2X synchronization type and a same SL-V-RNTI.

The communications apparatus provided in this embodiment of this application may perform the foregoing corresponding method embodiment. The implementation principles and the technical effects of the communications apparatus are similar to those in the method embodiment. Details are not described herein again.

For example, it should be understood that, division into the units of the apparatus is merely logical function division, and during actual implementation, all or some of the units may be integrated into a physical entity, or the units may be physically separate. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be a processing element disposed separately, or may be integrated into a chip of the apparatus for implementation. In addition, the sending unit may be stored in a memory of the apparatus in a form of a program, and invoked by a processing element of the apparatus to perform the function of the sending unit. Implementation of other units is similar to that of the sending unit. Optionally, the units are all or partially integrated, or may be implemented independently. The processing element herein may be an integrated circuit and has a signal processing capability. In an implementation process, the steps in the foregoing method or the foregoing units can be implemented by using a hardware integrated logic circuit in the processor element or by using instructions in a form of software. For example, the foregoing sending unit is a sending control unit, and may send information by using a sending apparatus of the apparatus, for example, an antenna and a radio frequency apparatus.

The foregoing units may be configured as one or more integrated circuits for implementing the foregoing method, for example, one or more application specific integrated circuits (application specific integrated circuit, ASIC), one or more microprocessors (digital signal processor, DSP), or one or more field programmable gate arrays (field programmable gate array, FPGA). For another example, when a unit is implemented by scheduling a program by a processing element, the processing component may be a general purpose processor, for example, a central processing unit (central processing unit, CPU) or another processor that can invoke the program. For another example, the units may be integrated together and implemented in a form of a system-on-a-chip (system-on-a-chip, SOC).

Figure 6:
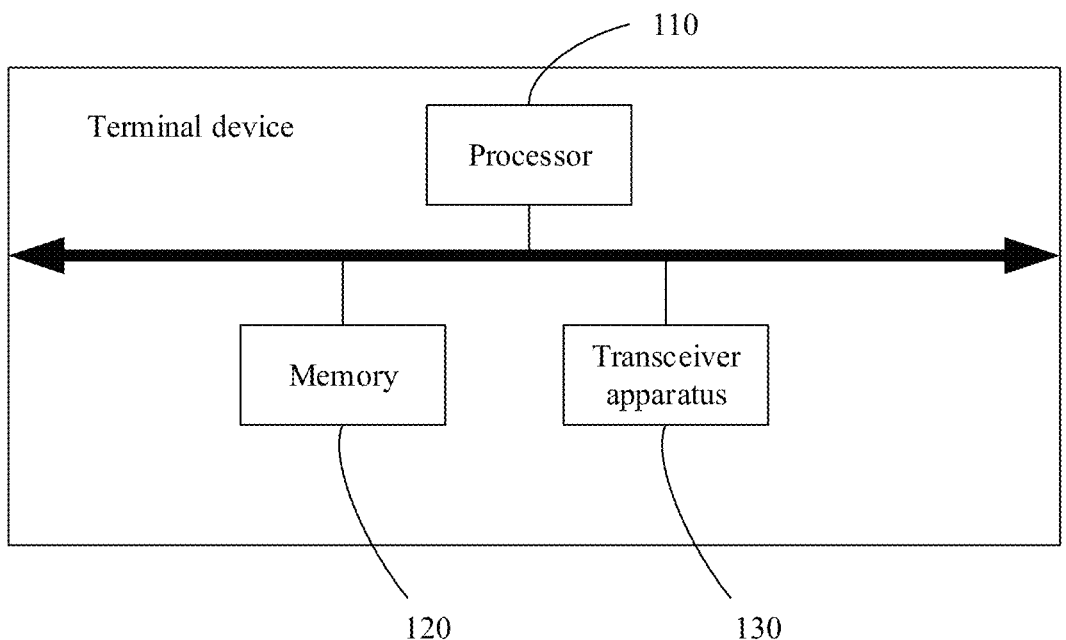
FIG. 6 is a schematic structural diagram of a terminal device according to an embodiment of this application.

FIG. 6 is a schematic structural diagram of a terminal device according to an embodiment of this application. As shown in FIG. 6, the terminal device includes a processor 110, a memory 120, and a transceiver apparatus 130. The transceiver apparatus 130 may be connected to an antenna. In a downlink, the transceiver apparatus 130 receives, by using the antenna, information sent by a base station, and sends the information to the processor 110 for processing. In an uplink, the processor 110 processes data of the terminal device, and sends the data to the base station by using the transceiver apparatus 130.

The memory 120 is configured to store a program for implementing the foregoing method embodiment or the modules in the embodiment shown in FIG. 4, and the processor 110 invokes the program to perform the operations in the foregoing method embodiment, to implement the modules shown in FIG. 4.

Alternatively, some or all of the foregoing modules may be implemented in a form of an integrated circuit that is embedded in a chip of the terminal device. In addition, they may be separately implemented, or may be integrated together. To be specific, the foregoing units may be configured as one or more integrated circuits for implementing the foregoing method, for example, one or more application specific integrated circuits (application specific integrated circuit, ASIC), one or more microprocessors (digital signal processor, DSP), or one or more field programmable gate arrays (field programmable gate array, FPGA).

Figure 7:
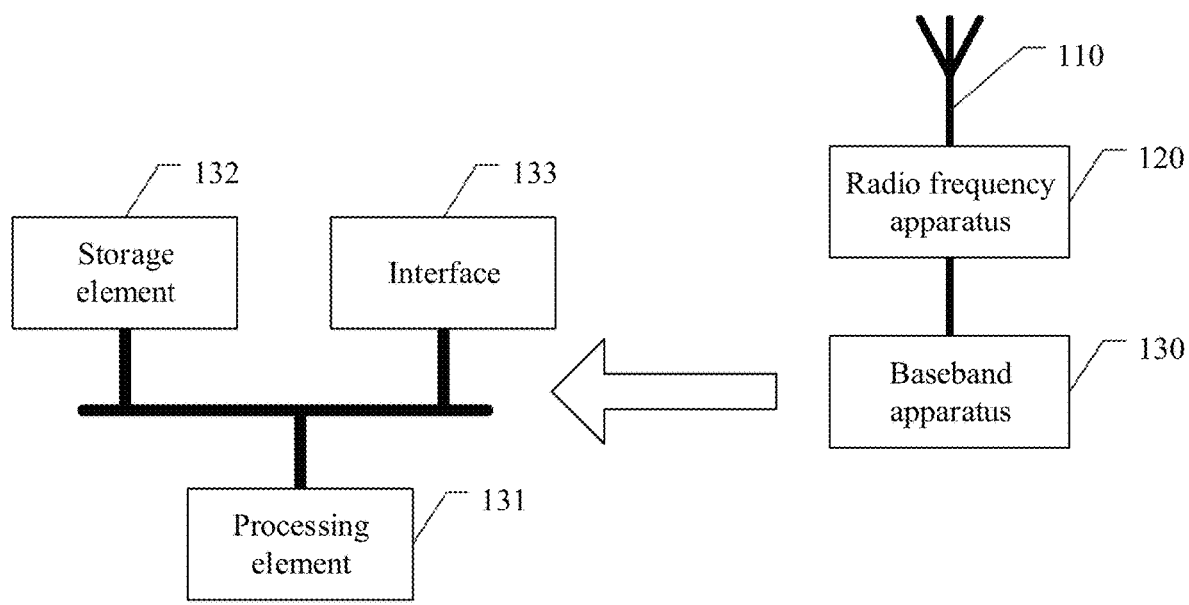
FIG. 7 is a schematic structural diagram of a base station according to an embodiment of this application.

FIG. 7 is a schematic structural diagram of a base station according to an embodiment of this application. As shown in FIG. 7, the base station includes an antenna 110, a radio frequency apparatus 120, and a baseband apparatus 130. The antenna 110 is connected to the radio frequency apparatus 120. In an uplink, the radio frequency apparatus 120 receives, by using the antenna 110, information sent by a terminal device, and sends, to the baseband apparatus 130 for processing, the information sent by the terminal device. In a downlink, the baseband apparatus 130 processes the information sent by the terminal device, and sends the information to the radio frequency apparatus 120. The radio frequency apparatus 120 processes the information sent by the terminal device, and then sends the processed information to the terminal device by using the antenna 110.

In an implementation, the foregoing modules are implemented in a form of a processing element scheduling a program. For example, the baseband apparatus 130 includes a processing element 131 and a storage element 132, and the processing element 131 invokes a program stored in the storage element 132, to perform the method in the foregoing method embodiment. Optionally, the baseband apparatus 130 further includes an interface 133, configured to exchange information with the radio frequency apparatus 120. For example, the interface is a common public radio interface (common public radio interface, CPRI).

In another implementation, the foregoing modules may be configured as one or more processing elements to implement the foregoing method, and the processing elements are arranged on the baseband apparatus 130. The processing element herein may be an integrated circuit, for example, one or more ASICs, one or more DSPs, or one or more FPGAs. The integrated circuits may be integrated together to form a chip.

For example, the foregoing modules may be integrated in a form of a system-on-a-chip (system-on-a-chip, SOC). For example, the baseband apparatus 130 includes an SOC chip, configured to implement the foregoing method. The processing element 131 and the storage element 132 may be integrated into the chip, and the processing element 131 invokes the program stored in the storage element 132, to implement the foregoing method or functions of the foregoing units. Alternatively, at least one integrated circuit may be integrated in the chip to implement the foregoing method or functions of the foregoing units. Alternatively, the foregoing implementations may be combined, functions of some units are implemented by a processing element invoking a program, and functions of some units are implemented by using an integrated circuit.

Regardless of a manner, the base station may include at least one processing element, and may further include a storage element and/or a communications interface. The at least one processing element is configured to perform the method provided in the foregoing method embodiment. The processing element may perform some or all of the steps in the foregoing method embodiment in a first manner, to be specific, by executing the program stored in the storage element, or in a second manner, to be specific, by using a hardware integrated logic circuit in the processor element in combination with an instruction. Certainly, the method provided in the foregoing method embodiment may alternatively be performed by combining the first manner with the second manner.

The processing element herein is the same as that described above, may be a general purpose processor such as a central processing unit (central processing unit, CPU), or may be configured as one or more integrated circuits for implementing the foregoing method, for example, one or more application specific integrated circuits (application specific integrated circuit, ASIC), one or more microprocessors (digital signal processor, DSP), or one or more field programmable gate arrays (field programmable gate array, FPGA).

The storage element may be one memory, or may be a general name of a plurality of storage elements.

This application further provides a storage medium, including a readable storage medium and a computer program. The computer program is used to implement the communication method provided in any one of the foregoing embodiments.

This application further provides a program product. The program product includes a computer program (namely, an executable instruction). The computer program is stored in a readable storage medium. At least one processor of a terminal device may read the computer program from the readable storage medium. The at least one processor executes the computer program, so that the terminal device implements the communication method provided in the foregoing implementations.

An embodiment of this application further provides a communications apparatus, including at least one storage element and at least one processing element. The at least one storage element is configured to store a program. When the program is executed, the communications apparatus is enabled to perform an operation of the terminal device in any one of the foregoing embodiments. The apparatus may be a terminal device chip.

This application further provides a storage medium, including a readable storage medium and a computer program. The computer program is used to implement the communication method provided in any one of the foregoing embodiments.

This application further provides a program product. The program product includes a computer program (namely, an executable instruction). The computer program is stored in a readable storage medium. At least one processor of a base station may read the computer program from the readable storage medium. The at least one processor executes the computer program, so that the base station implements the communication method provided in the foregoing implementations.

An embodiment of this application further provides a communications apparatus, including at least one storage element and at least one processing element. The at least one storage element is configured to store a program. When the program is executed, the communications apparatus is enabled to perform an operation of the base station in any one of the foregoing embodiments. The apparatus may be a base station chip.

All or some of the steps of the method embodiment may be implemented by a program instructing related hardware. The foregoing program may be stored in a readable memory. When the program is executed, the steps of the method embodiments are performed. The memory (storage medium) includes a read-only memory (English: read-only memory, ROM), a RAM, a flash memory, a hard disk, a solid-state drive, a magnetic tape (magnetic tape), a floppy disk (floppy disk), an optical disc (optical disc), and any combination thereof.

What is claimed is:

1. A communication method, applied to a first terminal device and comprising:
    sending, by the first terminal device to a network device, information indicating whether the first terminal device supports a first-standard vehicle-to-everything (V2X) service and information indicating whether the first terminal device supports a second-standard V2X service, wherein the first-standard V2X service comprises a long term evolution (LTE) V2X service, and the second-standard V2X service comprises a new radio (NR) V2X service;
    receiving, by the first terminal device, one or both of a first-standard vehicle-to-everything (V2X) sidelink configuration and a second-standard V2X sidelink configuration from the network device based on the information indicating whether the first terminal device supports the first-standard V2X service and the information indicating whether the first terminal device supports the second-standard V2X service;
    obtaining, by the first terminal device based on one or both of the first-standard V2X sidelink configuration and the second-standard V2X sidelink configuration, a V2X sidelink resource used for data transmission; and
    communicating, by the first terminal device, with a second terminal device on the V2X sidelink resource.

2. The method according to claim 1, wherein the obtaining a V2X sidelink resource used for data transmission comprises:
sending, by the first terminal device, a second message to the network device, wherein the second message carries at least one piece of information that indicates a network standard; and
receiving, by the first terminal device, the V2X sidelink resource sent by the network device based on the network standard.

3. The method according to claim 1, wherein the obtaining a V2X sidelink resource used for data transmission comprises:
receiving, by the first terminal device, a configuration rule sent by the network device, wherein the configuration rule comprises at least one of the following information: a mapping relationship between a V2X service type and a resource, a mapping relationship between a quality of service (QoS) parameter and a resource, a QoS parameter threshold, or a sidelink quality threshold; wherein the sidelink quality threshold comprises one or both of a first-standard V2X sidelink quality threshold and a second-standard V2X sidelink quality threshold; and
determining, by the first terminal device, the V2X sidelink resource according to the configuration rule.

4. The method according to claim 1, wherein the information indicating that the first terminal device supports the first-standard V2X service is capability indication information indicating that the first terminal device supports the first-standard V2X service, the information indicating that the first terminal device supports the second-standard V2X service is capability indication information indicating that the first terminal device supports the second-standard V2X service.

5. A communication method, applied to a network device and comprising:
receiving, by the network device from a first terminal device, information indicating whether the first terminal device supports a first-standard vehicle-to-everything (V2X) service and information indicating whether the first terminal device supports a second-standard V2X service, wherein the first-standard V2X service comprises a long term evolution (LTE) V2X service, and the second-standard V2X service comprises a new radio (NR) V2X service;
sending, by the network device, based on the information indicating whether the first terminal device supports the first-standard V2X service and the information indicating whether the first terminal device supports the second-standard V2X service, one or both of a first-standard V2X sidelink configuration and a second-standard V2X sidelink configuration to the first terminal device, wherein one or both of the first-standard V2X sidelink configuration and the second-standard V2X sidelink configuration are used by the first terminal device to obtain a V2X sidelink resource used for data transmission and communicate with a second terminal device on the V2X sidelink resource.

6. The method according to claim 5, wherein the method further comprises:
obtaining, by the network device, at least one of the following information: grant information of the first terminal device, or sidelink aggregate maximum bit rates (AMBRs) of the first terminal device, wherein the sidelink AMBRs comprise a first-standard V2X sidelink AMBR or a second-standard V2X sidelink AMBR; and
the sending, by the network device, one or both of a first-standard V2X sidelink configuration and a second-standard V2X sidelink configuration to a first terminal device comprises:
sending, by the network device, one or both of the first-standard V2X sidelink configuration and the second-standard V2X sidelink configuration to the first terminal device based on the at least one of the grant information, or the sidelink AMBRs.

7. The method according to claim 5, wherein the method further comprises:
receiving, by the network device, a second message sent by the first terminal device, wherein the second message carries at least one piece of information that indicates a network standard;
determining, by the network device, the V2X sidelink resource based on the network standard; and
sending, by the network device, the V2X sidelink resource to the first terminal device.

8. The method according to claim 5, wherein the method further comprises:
sending, by the network device, a configuration rule to the first terminal device, wherein the configuration rule comprises at least one of the following information: a mapping relationship between a V2X service type and a resource, a mapping relationship between a quality of service (QoS) parameter and a resource, a QoS parameter threshold, or a sidelink quality threshold;
wherein the sidelink quality threshold comprises one or both of a first-standard V2X sidelink quality threshold and a second-standard V2X sidelink quality threshold, and the configuration rule is used by the first terminal device to determine the V2X sidelink resource.

9. The method according to claim 6, wherein the information indicating that the first terminal device supports the first-standard V2X service is capability indication information indicating that the first terminal device supports the first-standard V2X service, the information indicating that the first terminal device supports the second-standard V2X service is capability indication information indicating that the first terminal device supports the second-standard V2X service.

10. A communication apparatus, applied to a first terminal device and comprising:
at least one processor, and a memory storing instructions for execution by the at least one processor;
wherein, when executed, the instructions cause the apparatus to perform operations comrising:
sending, to a network device, information indicating whether the first terminal device supports a first-standard vehicle-to-everything (V2X) service and information indicating whether the first terminal device supports a second-standard V2X service, wherein the first-standard V2X service comprises a long term evolution (LTE) V2X service, and the second-standard V2X service comprises a new radio (NR) V2X service;
receiving, one or both of a first-standard vehicle-to-everything (V2X) sidelink configuration and a second-standard V2X sidelink configuration from the network device based on the information indicating whether the first terminal device supports the first-standard V2X service and the information indicating whether the first terminal device supports the second-standard V2X service;

obtaining, based on one or both of the first-standard V2X sidelink configuration and the second-standard V2X sidelink configuration, a V2X sidelink resource used for data transmission; and communicating, with a second terminal device on the V2X sidelink resource.

11. The communication apparatus according to claim 10, wherein the obtaining a V2X sidelink resource used for data transmission comprises:

sending, a second message to the network device, wherein the second message carries at least one piece of information that indicates a network standard; and receiving, the V2X sidelink resource sent by the network device based on the network standard.

12. The communication apparatus according to claim 10, wherein the obtaining a V2X sidelink resource used for data transmission comprises:

receiving, a configuration rule sent by the network device, wherein the configuration rule comprises at least one of the following information: a mapping relationship between a V2X service type and a resource, a mapping relationship between a quality of service (QoS) parameter and a resource, a QoS parameter threshold, or a sidelink quality threshold; wherein the sidelink quality threshold comprises one or both of a first-standard V2X sidelink quality threshold and a second-standard V2X sidelink quality threshold; and determining, the V2X sidelink resource according to the configuration rule.

13. The communication apparatus according to claim 10, wherein the information indicating that the apparatus supports the first-standard V2X service is capability indication information indicating that the apparatus supports the first-standard V2X service, the information indicating that the apparatus supports the second-standard V2X service is capability indication information indicating that the apparatus supports the second-standard V2X service.

14. A communication apparatus, applied to a network device and comprising:

at least one processor, and a memory storing instructions for execution by the at least one processor;

wherein, when executed, the instructions cause the apparatus to perform operations comrising:

receiving, from a first terminal device, information indicating whether the first terminal device supports a first-standard vehicle-to-everything (V2X) service and information indicating whether the first terminal device supports a second-standard V2X service, wherein the first-standard V2X service comprises a long term evolution (LTE) V2X service, and the second-standard V2X service comprises a new radio (NR) V2X service;

sending, based on the information indicating whether the first terminal device supports the first-standard V2X service and the information indicating whether the first terminal device supports the second-standard V2X service, one or both of a first-standard V2X sidelink configuration and a second-standard V2X sidelink configuration to the first terminal device, wherein one or both of the first-standard V2X sidelink configuration and the second-standard V2X sidelink configuration are used by the first terminal device to obtain a V2X sidelink resource used for data transmission and communicate with a second terminal device on the V2X sidelink resource.

15. The communication apparatus according to claim 14, wherein when executed, the instructions cause the apparatus to perform operations comrising:

obtaining, at least one of the following information: grant information of the first terminal device, or sidelink aggregate maximum bit rates (AMBRs) of the first terminal device, wherein the sidelink AMBRs comprise a first-standard V2X sidelink AMBR or a second-standard V2X sidelink AMBR; and the sending, one or both of a first-standard V2X sidelink configuration and a second-standard V2X sidelink configuration to a first terminal device comprises:

sending, one or both of the first-standard V2X sidelink configuration and the second-standard V2X sidelink configuration to the first terminal device based on the at least one of the grant information, or the sidelink AMBRs.

16. The communication apparatus according to claim 14, wherein when executed, the instructions cause the apparatus to perform operations comrising:

receiving, a second message sent by the first terminal device, wherein the second message carries at least one piece of information that indicates a network standard;

determining, the V2X sidelink resource based on the network standard; and sending, the V2X sidelink resource to the first terminal device.

17. The communication apparatus according to claim 14, wherein, when executed, the instructions cause the apparatus to perform operations comrising:

sending, a configuration rule to the first terminal device, wherein the configuration rule comprises at least one of the following information: a mapping relationship between a V2X service type and a resource, a mapping relationship between a quality of service (QoS) parameter and a resource, a QoS parameter threshold, or a sidelink quality threshold; wherein the sidelink quality threshold comprises one or both of a first-standard V2X sidelink quality threshold and a second-standard V2X sidelink quality threshold, and the configuration rule is used by the first terminal device to determine the V2X sidelink resource.

18. The communication apparatus according to claim 15, wherein the information indicating that the first terminal device supports the first-standard V2X service is capability indication information indicating that the first terminal device supports the first-standard V2X service, the information indicating that the first terminal device supports the second-standard V2X service is capability indication information indicating that the first terminal device supports the second-standard V2X service.

* * * * *

UNITED STATES PATENT AND TRADEMARK OFFICE
CERTIFICATE OF CORRECTION

| | |
|---|---|
| PATENT NO. | : 11,399,361 B2 |
| APPLICATION NO. | : 17/132632 |
| DATED | : July 26, 2022 |
| INVENTOR(S) | : Wenjie Peng, Jun Wang and Mingzeng Dai |

Page 1 of 1

It is certified that error appears in the above-identified patent and that said Letters Patent is hereby corrected as shown below:

In the Claims

Column 60 / Line 51 - In Claim 10, delete "comrising:" and insert -- comprising: --.

Column 61 / Line 43 (Approx.) - In Claim 14, delete "comrising:" and insert -- comprising: --.

Column 62 / Line 9 - In Claim 15, delete "comrising:" and insert -- comprising: --.

Column 62 / Line 26 (Approx.) - In Claim 16, delete "comrising:" and insert -- comprising: --.

Column 62 / Line 36 - In Claim 17, delete "comrising:" and insert -- comprising: --.

Signed and Sealed this
Twenty-fifth Day of April, 2023

Katherine Kelly Vidal
*Director of the United States Patent and Trademark Office*